US007839308B2

(12) United States Patent
Kim et al.

(10) Patent No.: US 7,839,308 B2
(45) Date of Patent: Nov. 23, 2010

(54) USING CODEWORDS IN A WIRELESS COMMUNICATION SYSTEM

(75) Inventors: Byoung-Hoon Kim, Seoul (KR); Dung N. Doan, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 12/027,972

(22) Filed: Feb. 7, 2008

(65) Prior Publication Data

US 2009/0016459 A1  Jan. 15, 2009

Related U.S. Application Data

(60) Provisional application No. 60/889,252, filed on Feb. 9, 2007.

(51) Int. Cl.
*H03M 7/34* (2006.01)
*H03M 7/38* (2006.01)

(52) U.S. Cl. .................... 341/51; 375/260; 375/262; 375/295; 375/316

(58) Field of Classification Search ............ 341/51
See application file for complete search history.

(56) References Cited

U.S. PATENT DOCUMENTS 6,751,187 B2 * 6/2004 Walton et al. ............ 370/210
2006/0234752 A1 * 10/2006 Mese et al. ............... 455/522

OTHER PUBLICATIONS

"International Search Report and Written Opinion - PCT/US08/053504 - ISA/EPO - Jul. 3, 2008".

Souto et al.: "Partitioned Turbo Super Orthogonal Codes for a UMTS CAS- CMDA Scheme" Spread Spectrum Techniques and Applications, 2004 IEEE Eighth Int'l Symposium on Sydney, Australia, Aug. 30 - Sep. 2, 2004, Piscataway NJ, USA IEEE, pp. 285-289.
R. Van Nee and R. Prasad, "The Peak Power Problem", Chapter 6 OFDM for Wireless Multimedia Communications, pp. 119-154, Artech House Publishers, Boston, London, 2000.
B. M. Hochwald, T. L. Marzetta, T. J. Richardson, W. Sweldens, and R. Urbanke, "Systematic design of unitary space-time constellations," IEEE Trans. Inform. Theory, vol. 46, No. 6, pp. 1962-1973, Sep. 2000.
D. J. Love, R. W. Heath, and T. Strohmer, "Grassmannian beamforming for multiple input multiple-output wireless systems," IEEE Trans. Inform. Theory, vol. 49, No. 10, pp. 2735-2747, Oct. 2003.

* cited by examiner

*Primary Examiner*—Khai M Nguyen
(74) *Attorney, Agent, or Firm*—Kenneth Vu

(57) ABSTRACT

Systems, methodologies, and devices are described that can facilitate bandwidth efficient non-coherent signaling for uplink control channel transmissions. A communication device (e.g., a mobile device, base station) can be configured to utilize or generate a set of complex orthogonal codewords to facilitate transmission of control channel information using non-coherent signaling in a bandwidth efficient manner. A complex orthogonal codeword set can comprise a first subset of codewords where such codewords have a desirable cross-correlation property and another subset(s) of codewords that can include expurgated codewords, where the expurgated codewords can include discarded codewords and/or codeword pairs that produce a worst-case cross-correlation property. The codeword set and subsets are determined based at least in part on a predefined codeword criterion. A portion of the discarded codewords can be used for other purposes, such as erasure decoding, interference-level estimation, and/or multi-mode control channel operation.

56 Claims, 12 Drawing Sheets

USING CODEWORDS IN A WIRELESS COMMUNICATION SYSTEM

CROSS-REFERENCE TO RELATED APPLICATIONS

This application claims the benefit of U.S. Provisional Patent application Ser. No. 60/889,252 entitled "A METHOD AND APPARATUS FOR EFFICIENTLY USING CODEWORDS IN A WIRELESS COMMUNICATION SYSTEM" which was filed Feb. 9, 2007, the entirety of the aforementioned application is herein incorporated by reference.

BACKGROUND

I. Field

The following description relates generally to wireless communications, and more particularly to efficiently utilizing codewords in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . .). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out (SISO), multiple-in-single-out (MISO), single-in-multiple-out (SIMO), or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Transmissions between a mobile device and a base station can be across traffic channels and control channels. Transmissions for traffic channels between a mobile device and a base station can be accomplished utilizing complex orthogonal modulation. It can be desirable to utilize complex orthogonal modulation for uplink control channel transmissions, particularly when complex orthogonal transmission is utilized for traffic channel transmissions. However, efficient single carrier frequency division multiple access (SC-FDMA) or orthogonal frequency division multiple access (OFDMA) uplink control channel design can be challenging due in part to conflicting requirements (e.g., bandwidth limitations, etc.) that are to be considered for the design of uplink control channels.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating the transmission of control channel information between communication devices in a communication environment (e.g., wireless communication environment). The disclosed subject matter can utilize a complex orthogonal codeword set that can be structured and utilized for bandwidth-efficient non-coherent signaling associated with single carrier frequency division multiple access (SC-FDMA) or orthogonal frequency division multiple access (OFDMA) to transmit control channel information between communication devices. A complex orthogonal codeword set can comprise a first subset of codewords that have a desirable cross-correlation property and another subset(s) of codewords that can include expurgated codewords, where the expurgated codewords can include discarded codewords, where such codewords can be discarded to meet a desired spectral efficiency, and/or codeword pairs that produce an undesirable cross-correlation property (e.g., worst-case cross-correlation property). The codeword set and subsets can be determined based at least in part on a predefined codeword criterion. Multi-mode operation associated with the complex codewords can be employed to further improve bandwidth efficiency. In addition, the discarded codewords, or a portion thereof, can be employed for other desired purposes, such as erasure decoding and/or interference-level estimation, for example, to facilitate improved bandwidth efficiency.

According to related aspects, a method that facilitates transmission of information, for example, in a wireless communication environment is described herein. The method can include generating a set of codewords to facilitate transmission of information comprising control channel information. Further, the method can comprise expurgating a subset of the codewords based at least in part on a predefined codeword criterion.

Another aspect relates to a wireless communications apparatus. The wireless communications apparatus can include a memory that retains instructions related to transmitting information using codewords generated based at least in part on a predefined codeword criterion. Further, the wireless communications apparatus can include a processor, coupled to the memory, configured to execute the instructions retained in the memory.

Still another aspect relates to an apparatus. The apparatus can include a codeword generator that generates codewords based at least in part on a predefined codeword criterion to facilitate transmission of information comprising control channel information. The apparatus also can comprise an expurgator that expurgates codewords based at least in part on a predefined codeword criterion.

Yet another aspect relates to a wireless communications apparatus that facilitates transmission of information, for example, in a wireless communication environment. The wireless communications apparatus can include means for generating a subset of codewords to facilitate transmission of information. Further, the wireless communications apparatus can comprise means for expurgating a subset of the generated codewords based at least in part on a predefined codeword criterion.

Still another aspect relates to a machine-readable medium having stored thereon machine-executable instructions for generating a set of codewords to facilitate transmission of information; and expurgating a subset of codewords based at least in part on a predefined codeword criterion.

In accordance with another aspect, an apparatus in a wireless communication system can include a processor, wherein the processor can be configured to utilize a set of generated codewords, the codewords generated based at least in part on a predefined codeword criterion. Moreover, the processor can be configured to utilize a portion of the set of generated codewords to facilitate transmission of control channel information based at least in part on the predefined codeword criterion.

According to other aspects, a method that facilitates transmission of information associated with a communication environment is described herein. The method can include receiving signals associated with a generated set of codewords that facilitate transmitting information comprising control channel information based at least in part on a predefined codeword criterion. Further, the method can comprise decoding the received signals.

Yet another aspect relates to a wireless communications apparatus that can include a memory that retains instructions related to receiving signals associated with a generated set of codewords that facilitate transmitting information comprising control channel information based at least in part on a predefined codeword criterion and decoding the received signals. Further, the wireless communications apparatus can comprise a processor, coupled to the memory, configured to execute the instructions retained in the memory.

Another aspect relates to a wireless communications apparatus that facilitates transmission of information in a wireless communication environment. The wireless communications apparatus can include means for receiving signals associated with a generated set of codewords that facilitate transmitting information comprising control channel information based at least in part on a predefined codeword criterion. Further, the wireless communications apparatus can include means for decoding the received signals.

Still another aspect relates to a machine-readable medium having stored thereon machine-executable instructions for receiving signals associated with a generated set of codewords that facilitate transmitting information comprising control channel information based at least in part on a predefined codeword criterion, and decoding the received signals.

In accordance with another aspect, an apparatus in a wireless communication system can include a processor, wherein the processor can be configured to receive signals associated with a generated set of codewords that facilitate transmitting information comprising control channel information based at least in part on a predefined codeword criterion. Further, the processor can be configured to decode the received signals. Moreover, the processor can be configured to perform erasure decoding of received signals utilizing a subset of the generated set of codewords, the subset comprising discarded codewords.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
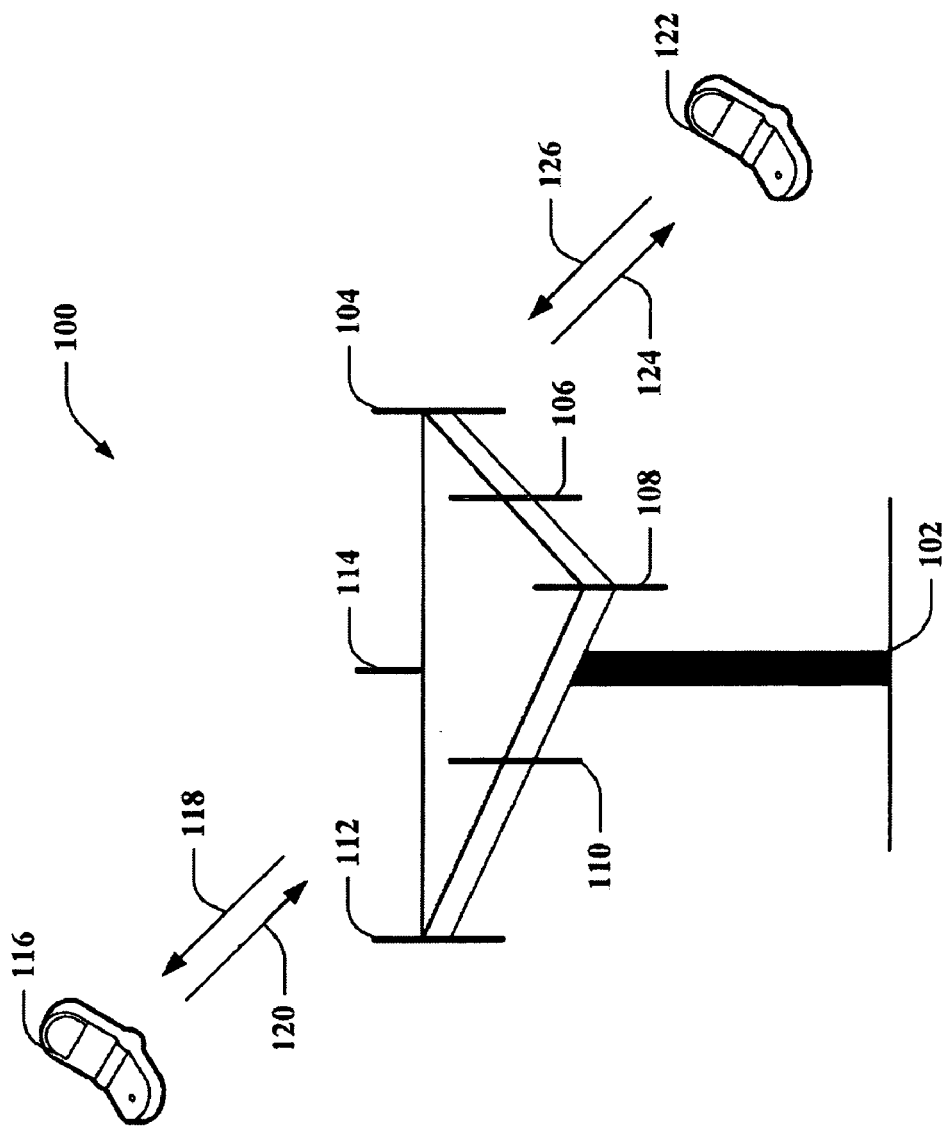
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like can refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

It can be desirable to employ non-coherent signaling, such as orthogonal modulation, to transmit control channels between to communication devices (e.g., mobile device, base station). For instance, when orthogonal multiplexing, such as single carrier frequency division multiplexing (SC-FDM) or orthogonal frequency division multiplexing (OFDM), is utilized for traffic channels, it can be desirable to utilize orthogonal multiplexing for a control channel(s) (e.g., Channel Quality Indicator Channel (CQICH), which can deliver downlink channel signal-to-interference plus noise ratio (SINR) measurement information and can be used as an uplink power control reference), as in terms of channel measurement, the same or similar interference can be observed between the traffic channel and control channel. For example, after decoding the control channel, by using the same type of multiplexing (e.g., orthogonal), the channel condition (e.g., interference condition) of the control channel can be measured and applied to the traffic channel to facilitate improved control and/or decoding of the traffic channel, which can result in improved transmission and reception of signals on the traffic channel. Such channel condition information is not available if the control channel does not utilize the same type of multiplexing (e.g., orthogonal) as the traffic channel. Another reason for using orthogonal modulation based on non-coherent signaling is that coherent signaling suffers from a pilot overhead, while orthogonal modulation with non-coherent signaling can remove the uplink pilot overhead.

Conventionally, the efficiency of orthogonal code for the control channel information transmission can be undesirably low. The subject innovation can extend the orthogonal modulation from binary to complex (e.g., quaternary) modulation, which can significantly improve bandwidth efficiency. The subject innovation also can optimize the efficiency of the orthogonal control channel by designing a set of bandwidth-efficient complex codewords that can have a significantly improved cross-correlation property, which can facilitate reducing the number of tones utilized for orthogonal multiplexing of uplink control channels, facilitate interference-level estimation, erasure detection, and/or facilitate the simultaneous or substantially simultaneous transmission of multiple types of control information (e.g., CQICH, Precoding Matrix Indicator Channel (PMICH), Scheduling Request Channel (SRCH), etc.). For instance, the subject innovation can design a desired (e.g., large) set of complex orthogonal codewords, and can expurgate worst-case codewords and/or additional codewords from the complex orthogonal code in order to create a bandwidth-efficient non-coherent signaling set of codewords with a desirable cross-correlation property. In addition, multi-mode operation can be employed using the designed complex codewords to further improve bandwidth efficiency.

As an example, typically with binary orthogonal modulation, which is based on a non-coherent signaling, to deliver 8 bits, can involve (256, 8) Hadamard code, and such binary orthogonal signaling can cost 256 tones, which can be an undesirable high amount, as it can be beyond the bandwidth budget for the orthogonal multiplexing of uplink control channels and will also provide an excessively low code rate (e.g., 1/32). In accordance with various embodiments, the subject innovation can reduce the number of tones employed to a significantly smaller number of tones (e.g., 32 tones or less) to deliver 8 bits for the orthogonal multiplexing of uplink control channels. For instance, the subject innovation can employ complex orthogonal modulation (e.g., quaternary phase-shift keying (QPSK)) for non-coherent signaling to reduce the number of tones utilized to transmit control channel information, as compared to binary orthogonal modulation, to facilitate bandwidth efficient non-coherent signaling. The candidate codewords that produce poor correlation (e.g., correlation of $1/\sqrt{2}$) can first be expurgated, which can improve the worst-case cross correlation between the remaining respective pairs of codewords. Further, a predetermined number of the remaining codewords can be discarded to meet the required spectral efficiency (e.g., the required number of valid codewords for a given number of tones). The discarded words can be employed for other purposes, such as interference-level estimation, erasure detection, etc.

In accordance with an aspect, a communication device, such as a mobile device (e.g., 116) and/or the base station 102, can be configured to utilize complex sequences for bandwidth efficient non-coherent signaling for uplink control channels (e.g., CQICH, PMICH, SRCH, etc.), for example, associated with SC-FDM or OFDM. The communication device can transmit a desired number of bits of control channel information, where such control channel information can be transmitted utilizing complex orthogonal modulation.

It is to be appreciated that, while the subject innovation is described herein with regard to a mobile device (e.g., 116) and a base station 102, the subject innovation is not so limited, and aspects of the subject innovation can be employed in virtually any communication device, whether communicating in a wireless environment or a wired environment.

In accordance with one embodiment, complex orthogonal modulation can be employed and utilized by a communication device(s) (e.g., 102, 116) where a high order modulation (e.g., QPSK) can be employed for non-coherent signaling to facilitate reducing the number of tones employed to transmit control channel information. In one aspect, the number of bits of control channel information desired to be transmitted can be split into multiple sets of bits and each set of bits can be encoded separately (e.g., employing Hadamard code). By splitting the bits of control channel information into multiple sets, the number of tones employed can be reduced to specified number of tones, as compared to the number of tones employed if the bits were not split, based at least in part on the number of bits in each group of bits and/or the number of groups of bits, for instance. The constellation can be expanded from binary to quaternary, and one subset of bits can be transmitted for the in-phase (I-phase) and another subset of bits can be transmitted for the quadrature-phase (Q-phase), such that the respective sequences of control channel information can be modulated using a high order modulation (e.g., QPSK) and can be transmitted over the specified number of tones. In another aspect, the codeword can be scrambled by a specific complex pseudo-random noise (PN) sequence of a specified length (e.g., equal to the number of tones in each set) to provide a better autocorrelation in the multipath channel.

For instance, in order to transmit a desired number of bits (e.g., 8 bits) of control channel information using binary orthogonal modulation, which is based on a non-coherent signaling, the signaling can involve (256, 8) Hadamard code, and such binary orthogonal signaling can cost $2^8$ tones (e.g., 256 tones). By employing complex orthogonal modulation the number of tones employed to transmit the desired number of bits of control channel information can be reduced, for example, to 16 tones to transmit 8 bits. In one aspect, the desired number of bits of control channel information can be separated into multiple sets of bits (e.g., 2 sets of bits), and each set can be separately encoded using the appropriate Hadamard Code. The constellation can be expanded from binary to quaternary, and 4 bits can be transmitted for the I-phase and 4 bits can be transmitted for the Q-phase, and as a result, instead of using $2^8$ tones (e.g., as with conventional binary orthogonal modulation), $2^4$ tones can be used. For instance, the 8 bits can be separated into two sets of 4 information bits, and each set can be separately encoded by (16, 4) Hadamard code. The two 16-long real binary sequences can be represented by the pair $(c_{I,m}, c_{Q,m})$ (m=0, 1, . . . , 255). The binary sequences can be QPSK modulated by s m=$s_m=c_{I,m}$+ $jc_{Q,m}$ and transmitted over 16 tones.

In another aspect, the codeword can be scrambled by a UE specific complex PN sequence of length 16 to provide a better autocorrelation in the multipath channel. In spite of the significant bandwidth reduction, it can be difficult to apply the above set of QPSK codewords to practical non-coherent signaling due to the significant cross-correlation among two different codewords, e.g., $$\rho(m,n) = \frac{|s_m^H s_n|}{\|s_m\| \|s_n\|} = \begin{cases} 1, & m = n \\ 0, \frac{1}{2}, \frac{1}{\sqrt{2}}, & m \neq n. \end{cases} \quad (1)$$

Note that the cross-correlation between codewords is an important parameter that governs the performance of non-coherent signaling. Typically, a pair of different codeword will not have the correlation value of unity, because of the difference in either the I-phase or Q-phase. In many cases, there can be orthogonal I-phase, but coincident Q-phase, or vice versa, between a pair of codewords. Whenever both the I-phase and the Q-phase are orthogonal, the correlation value (e.g., correlation property) can be 0, but if either the I-phase or the Q-phase is coincident but the other phase is orthogonal, or the I-phase of the first codeword is coincident to the Q-phase of the second codeword but the Q-phase of the first codeword is orthogonal to the I-phase of the second codeword, the correlation value can be ½ or 1/√2. A principal is that it is desirable to remove as many of these high correlation cases (e.g., worst-case cross-correlation value of 1/√2) as possible (to the extent that the required spectral efficiency is achievable) where a complex codeword has the perfect coincidence in either I-phase or Q-phase—if there is perfect coincidence in the I-phase, there can be undesirable correlation, and if there is perfect coincidence in the Q-phase, there can be undesirable correlation. If the I-phase of one codeword is perfectly coincident with the Q-phase of another codeword, there can be undesirable correlation with respect to such codewords as well. For example, in the flat fading channel, after being multiplied by a complex channel coefficient h and added by a background noise vector z with a normalized variance, the receiver (e.g., base station 102) can observe $$y = h\sqrt{\frac{E_s}{N_o}} s_m + z.$$

Then, the optimal non-coherent receiver can take the codeword that maximizes $$J(n) = |s_n^H y|^2 = \left| h\sqrt{\frac{E_s}{N_o}} s_n^H s_m + s_n^H z \right|^2, n = 0, 1, \ldots, 255. \quad (2)$$

In the case of diversity reception (e.g., due to the multipath or multiple receive antennas) of order L in the Rayleigh fading channel, the optimal metric can change to $$J(n) = \sum_{l=0}^{L-1} \alpha_l \frac{|s_n^H y_l|^2}{\|s\|^2} = \sum_{l=0}^{L-1} \frac{\alpha_l}{\|s\|^2} \left| h_l\sqrt{\frac{E_s}{N_o}} s_n^H s_m + s_n^H z_l \right|^2, \quad (3)$$

-continued $$n = 0, 1, \ldots, 255$$

with $$\alpha_l = \frac{\sigma_l^2 \|s\|^2 E_s/N_o}{1 + \sigma_l^2 \|s\|^2 E_s/N_o}, \text{ where } y_l = h_l \sqrt{\frac{E_s}{N_o}} s_m + z_l$$

is the l-th diversity reception of the codeword, $\sigma_l^2$ is the long-term average power of the l-th diversity channel, and $\|s\|^2$ is the common energy of the valid codewords. When the channel profile is not measurable, $\alpha_l$ can be set $\alpha_l=1$.

Typically, the high cross-correlation does not decrease in the above orthogonal complex code design even if the codeword length is increased, since the high correlation originates from a perfect collision of one dimension of a codeword with one dimension, which can result in a correlation value of ½, or two dimensions, which can result in a correlation value of 1/√2, of another codeword.

In accordance with another embodiment, independent real scrambling codes can be applied for I-phase and Q-phase of each codeword to facilitate reducing the peak cross-correlation of the complex orthogonal modulation in the non-coherent receiver (e.g., base station 102). For instance, the peak cross-correlation 1/√2 can occur between two complex orthogonal codewords $s_m=c_{I,m}+jc_{Q,m}$ and $s_n=c_{I,n}+jc_{Q,n}$ when the codewords satisfy the following two conditions:

[Condition 1] $c_{I,m}=c_{Q,m}=c_{Q,n}$ or $c_{I,m}=c_{Q,m}=c_{I,n}$, and (4a)

[Condition 2] $c_{I,n}\neq c_{Q,n}$. (4b)

In order to reduce the peak cross-correlation of the complex orthogonal modulation in the non-coherent receiver, independent real scrambling codes can be applied for I-phase and Q-phase of each codeword, where a first real scrambling code can be applied for the I-phase and a disparate real scrambling code can be applied for the Q-phase of each codeword. The two respective scrambling codes for I-phase and Q-phase can be represented by $a_I$ and $a_Q$, and the resulting complex orthogonal codewords can take the form of $$s_m=s_{I,m}+js_{Q,m}=(a_I \circ c_{I,m})+j(a_Q \circ c_{Q,m}), m=0, 1, \ldots, 255, \quad (5)$$

where the operator a∘b can be defined as an element-wise multiplication of the vectors a and b. In another aspect, the codewords can be further scrambled by a UE specific complex PN sequence of a specified length (e.g., length of 16 in the above example) to provide a better autocorrelation in the multipath channel.

The cross-correlation between two different codewords $s_m=s_{I,m}+js_{Q,m}$ and $s_n=s_{I,n}+js_{Q,n}$ is likely to reduce as it can take $$\rho(m,n) = \frac{|s_m^H s_n|}{\|s_m\| \|s_n\|} \qquad (6)$$

$$= \begin{cases} 1, & m = n \\ 0, & |R_{I,Q}(m,n) - R_{I,Q}(n,m)|, \left|\frac{1}{2} + j\left(\frac{R_{I,Q}(m,n) - }{R_{I,Q}(n,m)}\right)\right|, m \neq n, \end{cases}$$

where $$R_{I,Q}(m,n) = \frac{s_{I,m}^T s_{Q,n}}{\|s_m\| \|s_n\|} \text{ and } R_{I,Q}(n,m) = \frac{s_{I,n}^T s_{Q,m}}{\|s_m\| \|s_n\|}$$

are the pseudo-random variables which can be dependent on the codeword pair and the cross-correlation property of $a_I$ and $a_Q$. Making an assumption that $a_I$ and $a_Q$ are independent random binary sequences, $R_{I,Q}(m,n)$ and $R_{I,Q}(n,m)$ can be approximated as zero-mean gaussian random variables with variance of ¼N for a sequence length of N. Therefore, with the random scrambling sequences, the peak correlation can be statistically described by $$\bar{\rho} = \left|\frac{1}{2} + jG\left(0, \frac{1}{2N}\right)\right|, \qquad (7)$$

which is likely to be smaller than $1/\sqrt{2}$ when N is large. In the example of N=16 (N determined to be equal to 16 in accordance with the above example), a typical correlation value can be calculated to be:

$$\left|\frac{1}{2} + j\frac{1}{\sqrt{2N}}\right| \approx 0.53.$$

However, the worst-case cross-correlation can be larger than this typical correlation value (Welch's lower bound). By designing the pair of scrambling sequences $a_I$ and $a_Q$ so that the worst-case cross-correlation between I-phase and Q-phase can be minimized or reduced, the performance of the non-coherent demodulation can be improved.

In accordance with another embodiment, the bits of a control channel information can be split into multiple subsets and the subsets can be transmitted over separate time-division multiplexing (TDM) or frequency-division multiplexing (FDM) resources, where the splitting of such bits can facilitate reducing and/or controlling the worst-case cross-correlation property. In accordance with an aspect of the disclosed subject matter, binary orthogonal modulation can be employed, and a first subset of bits of control channel information can be transmitted to a receiver (e.g., base station 102) over a first subset of tones, and another subset of bits of control channel information can be transmitted to the receiver over another subset of tones.

As a result, the worst-case cross-correlation property of $1/\sqrt{2}$ will not be encountered between codewords, as, in this embodiment, the worst-case cross-correlation produced can have a value of ½ at most, as either the first subset or the second subset might be perfectly aligned to some other codeword. By employing separate transmissions of the first subset of bits and another subset of bits, using the separate bandwidth, the worst-case cross-correlation value of $1/\sqrt{2}$ can be avoided, as compared to the complex orthogonal modulation instance described hereinabove.

For instance, continuing along the previous example involving 8 bits of control channel information, the 8 bits of control channel information can be separated to two subsets of 4 information bits and each subset can be separately encoded by (16, 4) Hadamard code. The two 16-long real binary sequences (e.g., sub-codewords) can be modulated by binary phase-shift keying (BPSK) and transmitted over two sets of 16 frequency tones each. Each sub-codeword can be scrambled by a UE specific complex PN sequence of specified length (e.g., length of 16 bits in this example) to provide an improved autocorrelation in the multipath channel. At the receiver (e.g., base station 102), the information bits transmitted over the two sets of resources can be separately decoded by the peak energy detector (e.g., 1 out of 16, in the example) and concatenated to recover the original information bit sequence of length 8 bits.

In the example case of transmitting 8 bits of control channel information, 32 tones are utilized to transmit the 8 information bits, which is larger than 16 tones utilized for the complex orthogonal modulation but is much smaller than the 256 tones utilized for the primitive single binary orthogonal modulation. It is noted that the decoding is successful when both subsets of information bits are successfully decoded. In terms of the cross-correlation, the normalized worst-case cross-correlation produced can be ½, which can occur when either the first or the second sub-codewords of the two codewords are coincident. Thus, as compared to complex orthogonal modulation, the worst-case cross-correlation can be improved from $1/\sqrt{2}$ to ½ at the cost of doubled time-bandwidth consumption (e.g., 32 tones, instead of 16 tones).

Additionally, it can be desirable to allocate the two sub-codewords together within the coherent time and coherent bandwidth, as the multiple real orthogonal modulation may not be efficient in terms of multipath resistance performance due to the short length (or despreading period) of each sub-codeword (e.g., 16 tones) if the two resources experience different channels. The normalized out-of-peak values of autocorrelation of random sequences can be approximately $1/\sqrt{N}$ where N is a spreading factor (or integration length). Thus, in the above example, where two sets of 16 tones are transmitted separately, the multipath resistance can be degraded to approximately $1/\sqrt{16}=\frac{1}{4}$, as compared to the multipath resistance for 32 tones, which can be approximately $1/\sqrt{32}$.

In accordance with another embodiment, an expurgation-based complex orthogonal code can be designed and can be utilized by a communication device, such as a mobile device (e.g., 116) and/or a base station 102, to facilitate transmission of control channel information to a receiver (e.g., another communication device). In one aspect, the expurgation-based complex orthogonal code can be designed through a combination of the two high-rate orthogonal modulation techniques, as described herein. Designing a code where undesirable codewords (e.g., codeword pairs associated with worst-case cross-correlation value(s)) are expurgated from the set of available codewords can facilitate bandwidth efficient transmission of control channel information. For instance, it can be desirable to expurgate all codeword pairs that produce a correlation of $1/\sqrt{2}$, or at least expurgate as many such codeword pairs as possible. Thus, it can be desirable to expurgate codewords pairs where both the I-phase and the Q-phase of one codeword are coincident with either the I-phase or the Q-phase of another codeword (e.g., codeword pairs that satisfy condition 1 and condition 2 respectively associated with Equations 4a and 4b, as described herein), for example.

In accordance with an aspect, complex orthogonal modulation (e.g., QPSK) can be employed and a set of codewords can be generated based at least in part on a predefined codeword criterion. Further, a subset of the codewords, such as codewords producing a worst-case cross-modulation value (e.g., $1/\sqrt{2}$), can be expurgated based at least in part on a predefined codeword criterion. Also, a number of codewords of the set of codewords can be expurgated and discarded such that there is a desired (e.g., minimum) number of codewords remaining that can facilitate transmission of the desired number of bits of control channel information based at least in part on the predefined codeword criterion, where such discarded codewords, or a portion thereof can be employed for other purposes (e.g., interference-level estimation, erasure detection, multi-mode control channel, etc.). The predefined codeword criterion can relate to, for example, the available bandwidth, the number of codewords in the set of codewords, the number of bits of control channel information to be transmitted at a given time, the cross-correlation value of a respective pair of codewords, a type of orthogonal modulation transmission desired to be used, a defined worst-case cross-correlation value between codewords, a number of tones employed to facilitate transmission of control channel information, the number of discarded codewords desired to be available for other purposes (e.g., interference-level estimation, erasure detection, multi-mode control channel, etc.), and/or other factors.

In one aspect, a set of predetermined length real binary orthogonal (e.g., Hadamard) sequences can be generated. A pair of distinct sequences in that set of sequences can be selected, which can result in a certain number of available codewords based at least in part on the sequences selected. The distinct sequences selected can be such that they result in at least the number of codewords required to transmit the desired number of bits of control channel information (e.g., CQICH). Further, one of the distinct sequences can be utilized for the I-phase and the other distinct sequence can be utilized for the Q-phase to create the complex codeword. If there are additional codewords beyond the number of codewords required to facilitate transmission of the bits of control channel information, the additional codewords can be expurgated and discarded to meet the desired spectral efficiency (e.g., the desired number of valid codewords for a given number of tones). The discarded codewords can be utilized for other purposes, such as interference-level estimation, erasure detection, use in multi-mode control channel operation, etc.

For example, in continuing with the example where it is desired to transmit 8 bits of control channel information, the expurgated complex orthogonal code can be generated as follows. A set of 24-long real binary orthogonal (e.g., Hadamard) sequences by $\{c_l: l=0, 1, \ldots, 23\}$ can be generated. A pair of distinct sequences $\{(c_m, c_n): m \neq n\}$ out of the 24 binary orthogonal sequences can be selected, which can provide $_{24}C_2=276$ available codewords (e.g., $(24\cdot23)/2=276$ codewords). The 24 Hadamard codeword can be the smallest one that can result in at least the desired number of available codewords (e.g., 256 codewords) to facilitate transmission of 8 bits of control channel information, as there is no 23 Hadamard codeword, for instance, so the next smallest available Hadamard codeword is 20, which cannot produce at least the desired number of available codewords. As it is desired to have 256 codewords to accommodate the transmission of 8 bits of control channel information, a subset of 256 codewords can be selected by applying predefined design criterion (e.g., predefined codeword criterion), and the unselected codewords can be expurgated and discarded. In one aspect, the discarded 20 codewords can be used for other purposes (e.g., interference-level estimation, erasure detection, use in multi-mode control channel operation, etc.). The k-th expurgated complex orthogonal codeword of length 24 can be generated by $s_k=(b_I+jb_Q)\circ(c_{m(k)}+jc_{n(k)})$, $k=0, 1, \ldots, 255$, where a scrambling code, $b_I+jb_Q$, can be utilized and can be a communication device-specific normalized complex PN sequence that can be used to provide a better autocorrelation in the multipath channel. With regard to the above equation, the operator $\circ$ denotes an element-wise multiplication of the vectors (e.g., as defined herein), and $(c_{m(k)}, c_{n(k)})$ can be the pair of distinct binary orthogonal sequences corresponding to the k-th codeword. As the designed codeword is a complex codeword, and the complex codeword is multiplied by the common complex PN sequence, there is no change in the correlation structure, which is desirable, and there can be an improvement in the autocorrelation property of each codeword so each codeword can be more robust and can better suppress multipath interference.

The worst-case normalized cross-correlation between any two complex orthogonal sequences in the set designed by the expurgation becomes ½, since the conditions 1 and 2 (e.g., as discussed herein with regard to Equations 4a and 4b) cannot be satisfied due to the codeword expurgation condition ($c_{m(k)} \neq c_{n(k)}, \forall k$) applied in the code design. Note that the multiple real orthogonal modulation or coherent $2^{nd}$-order RM code also can have the worst-case cross-correlation of ½ while certain of the non-coherent signaling schemes through complex orthogonal modulation previously described herein can have larger cross-correlation values $1/\sqrt{2}$ and $$\hat{\rho} = \left| \frac{1}{2} + jG\left(0, \frac{1}{2N}\right) \right|, \text{ respectively.}$$

On the other hand, a transmitting communication device (e.g., mobile device 116) can employ the expurgation-based complex orthogonal modulation to facilitate transmitting 8 bits of control channel information over 24 tones through non-coherent signaling to a receiver (e.g., base station 102), which is better in terms of bandwidth efficiency than the multiple real orthogonal modulation, which utilizes 32 tones to transmit 8 bits of control channel information to a receiver. Moreover, the expurgation-based complex orthogonal modulation can be better than the multiple real orthogonal modulation in terms of multipath interference suppression efficiency as the despreading length can be equal to the codeword length. For example, in this example utilizing 24 tones, the suppression capability can be proportional to ¹⁄₂₄, which can be improved suppression capability as compared to the example employing 32 tones divided into two sets of 16 tones, which can have a suppression capability proportional to ¹⁄₁₆, as in the former instance (e.g., 24 tones), the entire allocated spectrum can be used for one piece of codewords, instead of two separate codeword pieces in the latter instance (e.g., two sets of 16 tones).

In accordance with another aspect, the receiver (e.g., communication device, such as a base station 102 or mobile device 116) can employ a sub-optimal multi-peak non-coherent decoding instead of the optimal decoding (e.g., as described herein with regard to Equations (2)-(3)) in order to decrease the receiver complexity, though the sub-optimal multi-peak non-coherent decoding potentially can degrade the decoding performance. In this case, the receiver can evaluate the correlation between the real orthogonal vector set $\{c_i\}$ and the descrambled observation vector $(b_I-jb_Q)\circ y$, where $(b_I-jb_Q)$ can be the descrambling sequence and y can be the received signal, to obtain the correlation metrics $$C(c_i)=c_i^T((b_I-jb_Q)\circ y), i=0,1,\ldots,15. \quad (8)$$

Multiplying one real codeword of the 24 binary codewords to the descrambled complex received signal, the I-phase and Q-phase of the correlation result can be realized in Equation (8). The decoding metrics can be calculated and compared, for example, by $$L(s_k)=|C(c_{m(k)})|^2+|C(c_{n(k)})|^2 \text{ (energy combining)} \quad (9)$$

or $$L(s_k)=Im[(C(c_{m(k)}))^*C(c_{n(k)}))]. \text{ (differential combining)} \quad (10)$$

In another aspect, the number of tones utilized to transmit a desired number of bits of control channel information can be further reduced and/or the number of discarded codewords available for other desired purposes can be increased by expanding the expurgation-based complex orthogonal modulation. In accordance with an aspect, $\{\bar{s}_k\}$, which can be obtained by swapping the I-phase and the Q-phase of each of the orthogonal codewords (except for the common scrambling code), can be added to the set of the expurgation-based complex orthogonal codewords to double the set size without degradation to the cross-correlation property among the codewords, because $s_k=(b_I+jb_Q)\circ(c_{m(k)}+jc_{n(k)})$ is orthogonal to $\bar{s}_k=(b_I+jb_Q)\circ(c_{n(k)}+jc_{m(k)})$, which is true as $c_{m(k)}$ is orthogonal to $c_{n(k)}$ and each elements of the vectors $c_{m(k)}$, $c_{n(k)}$, $b_I$, $b_Q$ have the constant magnitude (e.g., +1 or −1). Given such orthogonal relationship, the addition of $\{\bar{s}_k\}$ to the set of the expurgated complex orthogonal codewords does not degrade the cross-correlation property among the codewords, but such addition of $\{\bar{s}_k\}$ to the set of the expurgated complex orthogonal codewords can double the set size.

When the available number of tones is N, the set size of the original expurgation-based complex orthogonal code is $_NC_2=N(N-1)/2$ while the expanded set size can be $_NP_2=N(N-1)$. As a result, in the example of 8 bits of control channel information, where 256 codewords is desired to facilitate transmission of the 8 bits from a transmitting communication device (e.g., mobile device 116) to a receiver (e.g., communication device, such as base station 102), the smallest number of tones that satisfies $N(N-1)\geq 256$ is 17. Therefore, a 20-long real binary Hadamard sequences by $\{c_i: I=0, 1, \ldots, 19\}$ can be employed instead of 24-long real binary Hadamard sequences, as utilized in the previous example. The expanded set size can result in 380 codewords (e.g., 20·19=380 codewords). Of the 380 expanded expurgation-based complex orthogonal codewords, a subset of 256 words can be selected based at least in part on predefined design criterion (e.g., predefined codeword criterion). The other 124 codewords can be discarded, and the discarded 124 codewords can be used for other purposes (e.g., interference-level estimation, erasure detection, use in multi-mode channel operation, etc.). The 124 discarded codewords available for other desired purposes is a significant increase over the 20 discarded codewords available in the previous example. Further, this expanded code utilizes 20 QPSK tones to transmit 8 bits of control channel information to a receiver, while maintaining the normalized worst-case cross-correlation value of ½. When employing the expanded expurgation-based orthogonal codewords, a corresponding receiver (e.g., communication device) should employ the optimal non-coherent detection, as described herein.

In accordance with still another aspect, erasure decoding can be applied in non-coherent signaling to facilitate erasure detection and decoding of a received signal during transmission of control channel information. When employing expurgation-based (or expanded expurgation-based) complex orthogonal modulation, discarded words can be utilized for other purposes, such as erasure decoding, and when employed for erasure decoding, the discarded codewords can be used to facilitate controlling the threshold for erasure detection.

For instance, as the discarded codewords are not used as part of the transmission of the control channel signal, when the transmission is received, the discarded codewords, or a portion thereof, can be utilized for erasure decoding or other purposes. The discarded codewords can be correlated with the incoming signal, which can facilitate measuring or estimating the interference level (e.g., interference-level estimation). It can be beneficial to measure the background noise level using such discarded codewords. Also, threshold levels can be fine tuned using the discarded codewords.

There can be a variety of techniques for applying erasure decoding. In an aspect, a receiver (e.g., communication device, such as base station 102 or mobile device 116) can employ erasure decoding to the non-coherent signaling. The receiver can receive a non-coherent signal during transmission of control channel information. For instance, the receiver can be a base station 102 that can receive control channel information from a mobile device (e.g., 116).

The receiver can determine the codeword by maximum likelihood (ML) decoding, such as described herein with regard to Equations (2)-(3). The receiver can select the codewords that are perfectly orthogonal (e.g., cross-correlation of 0) to the determined codeword. The receiver can calculate the average of the decoder output energy values corresponding to the selected codewords. The receiver can determine the difference (or, alternatively, the ratio) between the energy values of the determined codewords and the average decoder output energy values corresponding to the selected codewords. The receiver can determine whether the metric of the difference (or, alternatively, the ratio) between the energy values of the determined codewords and the average decoder output energy values corresponding to the selected codewords is greater than or equal to a predetermined threshold level associated with the decoding result. If such metric is greater than or equal to the predetermined threshold level, the receiver can determine that the decoding result is valid; and if such metric is less than the predetermined threshold level, the receiver can determine that the decoding result is not valid and can declare an erasure.

In accordance with yet another aspect, the determined codeword can be utilized as if it was a known sequence to facilitate application of erasure decoding in non-coherent signaling to facilitate decoding of a received signal during transmission of control channel information. The receiver (e.g., communication device, such as a base station 102) can utilize the determined codeword, with the assumption that the decoding is correct, to estimate the propagation channel coefficients. The determined or declared codeword can be utilized as a reference signal or pilot signal, which can be utilized to facilitate constructing the control channel. After constructing the channel, the channel power can be measured. The receiver can remove (e.g., subtract) the signal component corresponding to the determined codeword from the received signal. The receiver can calculate the average power of the remaining signal (e.g., after removing the signal component from the received signal) to estimate the background noise level. It should be noted that the background noise level will be high if the decoding is incorrect. The receiver can calculate the signal-to-noise ratio (SNR) based at least in part on the channel estimation (e.g., estimation of the propagation channel coefficients) and the noise level estimation.

It is to be appreciated that the application of erasure decoding described herein is one of but many techniques that can be employed to perform erasure decoding, and the subject innovation is not so limited, as the subject innovation contemplates that other techniques can be employed by a receiver or other component to perform erasure decoding of a received non-coherent signal. The receiver can determine whether the SNR is greater than or equal to a predetermined threshold level for determining a valid decoding result. If the receiver determines that the SNR is greater than or equal to the predetermined threshold level, the receiver can determine the determined codeword is a valid decoding result. If the receiver determines that the SNR is less than the predetermined threshold level, the receiver can determine that the determined codeword is not a valid decoding result, and the receiver can declare an erasure.

In accordance with yet another aspect of the disclosed subject matter, a communication device (e.g., mobile device 116, base station 102) can utilize discarded codewords for multi-mode control channel. For instance, in addition to utilizing a select number of codewords for transmission of a first type of control channel information (e.g., CQICH), a communication device can utilize other codewords (e.g., discarded codewords) to facilitate transmission of one or more other types of control channel information (e.g., PMICH, SRCH, etc.) to a receiving communication device. A predetermined number of bits of CQICH and/or a predetermined number of bits of other control channel information (e.g., PMICH, SRCH, etc.) can be transmitted from a transmitting communication device (e.g., mobile device 116) to a receiving communication device (e.g., base station 102), based at least in part on a predefined codeword criterion that can relate to the available bandwidth, available codewords, the number of tones, the type of orthogonal modulation, and/or other factors, such as described herein, for example.

The multi-mode operation of the designed code between CQICH and PMICH, for example, can be desirable if the changing rate of the precoder is significantly slower than the changing rate of the channel SNR. In one aspect, the transmitting device (e.g., mobile device 116) can transmit PMICH to the receiver (e.g., base station 102) when it is desired (e.g., necessary) to update the precoder. Otherwise, CQICH can be transmitted alone or CQICH and other control channel information (e.g., SRCH) can be sent, as desired. Infrequent replacement of the CQICH by PMICH will not affect the AMC operation significantly. In accordance with an aspect of the disclosed subject matter, the multi-mode operation to transmit more than one type of control channel information can be performed in conjunction with using expurgated codewords for other purposes, such as erasure decoding, interference-level estimation, etc.

For instance, to continue with the previous example of transmitting 8 bits of control channel (e.g., CQICH) information, by employing the expanded expurgation-based complex orthogonal modulation, and utilizing 20 QPSK tones, there can be 380 available codewords. The 256 codewords can be selected from the 380 available codewords, and can be utilized to facilitate CQICH transmission from the transmitting device (e.g., mobile device 116) to the receiving device (e.g., base station 102). The remaining 124 codewords can be the discarded or expurgated codewords that can be available for use for other purposes, where, for example, a portion of the discarded codewords can be used to facilitate the transmission of other control information. If the designed code is used for CQICH and PMICH (and/or SRCH, etc.), the 8-bit CQICH or 6-bit PMICH can be transmitted from the transmitting communication device to the receiving communication device, where with the 6-bit PMICH transmission, the PMICH can be transmitted using 64 of the discarded codewords of the 124 available discarded codewords, and there can remain 60 discarded codewords, which can be utilized for other purposes, such as to facilitate adjusting the threshold of an erasure decoding or to deliver a third control channel (e.g., SRCH, request related to the uplink resource allocation), for example. As the set of the codewords is distinguishable between the CQICH and the PMICH, the receiving communication device (e.g., base station 102) can properly interpret the decoding result whether the received signal is for CQICH or PMICH if the decoding is successful.

In a same or similar way, if it is desired to transmit 7-bit CQICH from a transmitting communication device to a receiving communication device, employing the expanded expurgation-based complex orthogonal modulation, 16 QPSK tones can be utilized and 240 codewords can be designed and available based at least in part on the number of tones. The 7-bit CQICH or 6-bit PMICH can be transmitted, which can utilize 192 codewords, and 48 discarded codewords can remain, and can be used for other desired purposes. Alternatively, 12 QPSK tones can be chosen and 132 codewords can be designed and available to transmit the 7-bit CQICH only. Depending in part on the bitwidth desired for PMICH and/or SRCH transmission, additional QPSK tones can be desirable for the latter design.

The subject innovation can utilize complex sequences for bandwidth-efficient non-coherent signaling of control channel information by a communication device to another communication device. In accordance with various aspects and embodiments, the subject innovation can employ complex orthogonal code and can expurgate worst-case codewords from the complex orthogonal code to create a bandwidth-efficient non-coherent signaling set of codewords that can have a desirable cross-correlation property. Further, in accordance with various aspects and embodiments, by partitioning the designed codeword into multiple subsets of codewords, the complex orthogonal code can be utilized for one or more control channels, such as CQICH, PMICH, and/or SRCH, to further improve bandwidth efficiency.

Figure 2:
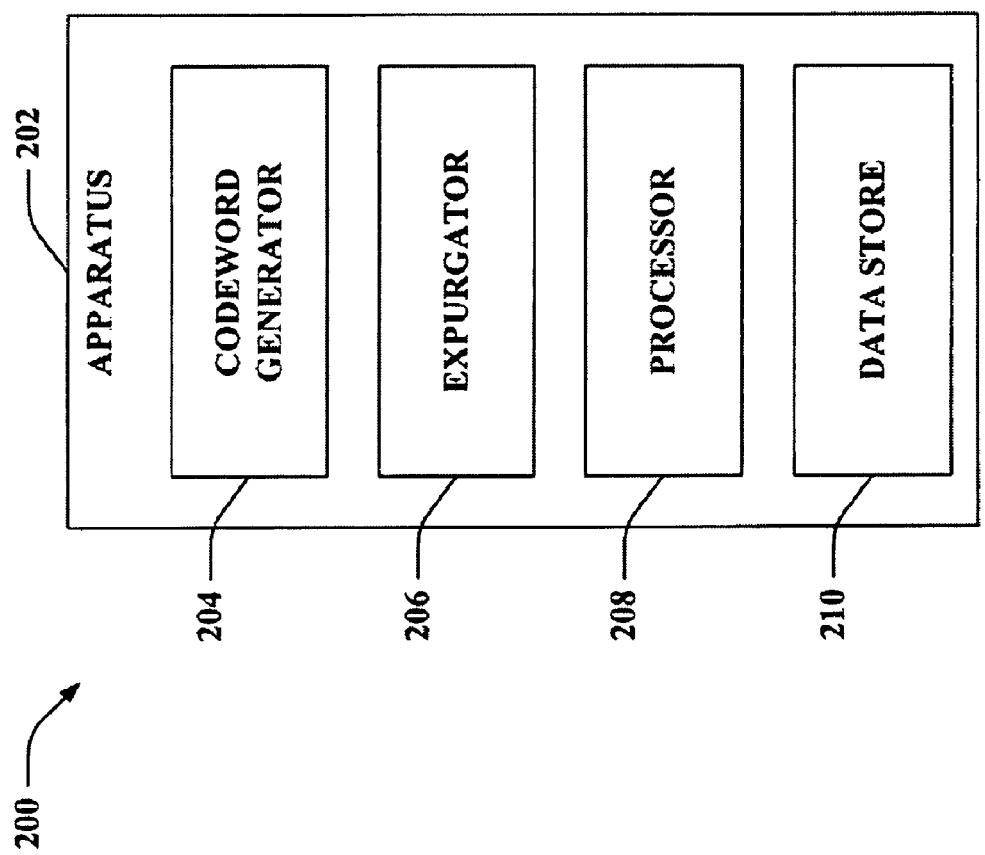
FIG. 2 is an illustration of an example system that can facilitate generation of codewords to facilitate transmission of information between communication devices in accordance with an embodiment of the disclosed subject matter.

With reference to FIG. 2, illustrated is a system 200 that can facilitate a design and/or generation of codewords to facilitate transmission of information between communication devices in accordance with an embodiment of the disclosed subject matter. System 200 can include an apparatus 202 that can configured to facilitate designing and/or generating codewords that can be utilized to facilitate transmission of information, such as control channel information, erasure decoding information, interference-level estimation information, and/or other information between a transmitting communication device (e.g., mobile device 116) and a receiving communication device (e.g., base station 102). In accordance with one embodiment, the apparatus 102 can be a computer or other computing device that can facilitate designing and generating codewords. It is to be appreciated that apparatus 202 can comprise the same or similar functionality related to designing and/or generating codewords, such as more fully described herein, for example, with regard to system 100. For example, the apparatus 202 can facilitate structuring and/or generating codewords related to binary orthogonal modulation, complex orthogonal modulation, expurgation-based complex orthogonal modulation, expanded expurgation-based complex orthogonal modulation, etc. to facilitate transmitting information (e.g., control channel information, erasure decoding information, etc.) in a bandwidth-efficient manner using non-coherent signaling between communication devices.

Apparatus 202 can comprise a codeword generator 204 that can generate codewords. The codewords can be generated based at least in part on a predefined codeword criterion, in order to obtain codewords with a desired design. The predefined codeword criterion can relate to, for example, the available bandwidth, the number of codewords in the set of codewords, the number of bits of control channel information to be transmitted at a given time, the cross-correlation value of a respective pair of codewords, a type of orthogonal modulation transmission (e.g., binary orthogonal modulation, complex orthogonal modulation, expurgation-based complex orthogonal modulation, expanded expurgation-based complex orthogonal modulation, etc.) desired to be used, a defined worst-case cross-correlation value between codewords, a number of tones employed to facilitate transmission of control channel information, the number of discarded codewords desired to be available for other purposes (e.g., interference-level estimation, erasure detection, multi-mode control channel, etc.), and/or other factors.

In accordance with another aspect, the apparatus 202 can include an expurgator 206 that can be associated with the codeword generator 204. A set of codewords can be generated, and the expurgator 206 can facilitate expurgating a subset of the codewords of the codeword set based at least in part on the predefined codeword criterion. For example, the expurgator 206 can facilitate expurgating codeword pairs that produce a worst-case cross-correlation value (e.g., $1/\sqrt{2}$) and/or other undesirable cross-correlation values. In one embodiment, the expurgator 206 can facilitate structuring an expurgation-based complex orthogonal code (and/or expanded expurgation-based orthogonal code) such that the worst-case cross-correlation between any two expurgated complex orthogonal sequences is ½ (as opposed to $1/\sqrt{2}$) by employing a codeword expurgation condition, $c_{m(k)} \neq c_{n(k)}, \forall k$, so that the conditions 1 and 2 associated with Equations 4a and 4b, as described herein, cannot be satisfied.

In still another aspect, the expurgator 206 also can facilitate expurgating a desired number of codewords to discard such codewords in order to meet the desired spectral efficiency (e.g., the predetermined threshold number of valid codewords desired for a given number of tones). The remaining codewords in the codeword set can be selected as codewords that can be utilized to facilitate transmission of certain control channel information (e.g., CQICH). The discarded codewords can be utilized, as desired, for other purposes, such as erasure decoding, interference-level estimation, and/or multi-mode control channel operation (e.g., to facilitate transmission of other control channel information, such as PMICH and/or SRCH).

The apparatus 202 can also comprise a processor 208 that can be coupled to a data store 210, the codeword generator 204, and the expurgator 206, and can process and/or analyze data to facilitate designing and/or generating codewords, selecting codewords, expurgating codewords, etc. in order to facilitate transmitting information, including control channel information, between communication devices.

The apparatus 202 can further include the data store 210 that can be operatively coupled to the processor 208 and can store data to be transmitted, received data, information related to the generation of codewords, the expurgation of codewords, the transmission or reception of control channel information (e.g., information related to complex orthogonal modulation, expurgation-based complex orthogonal modulation, and/or expanded expurgation-based complex orthogonal modulation, etc.), information relevant to erasure decoding and/or interference-level estimation, and any other suitable information that can facilitate designing and/or generating codewords to facilitate transmission and/or reception of information, such as control channel information, between communication devices, such as a mobile device (e.g., 116) and a base station 102. Data store 210 can additionally store protocols and/or algorithms associated with designing and/or generating codewords, expurgating codewords, orthogonal modulation (e.g., binary orthogonal modulation, complex orthogonal modulation, expurgation-based complex orthogonal modulation, and/or expanded expurgation-based complex orthogonal modulation, etc.), erasure decoding, interference-level estimation, etc.

It will be appreciated that the data store 210 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 210 of the subject systems and methods is intended to comprise, without being limited to, these and any other suitable types of memory.

Referring to FIGS. 3-7, methodologies relating to employing complex sequences for bandwidth efficient non-coherent signaling in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 3:
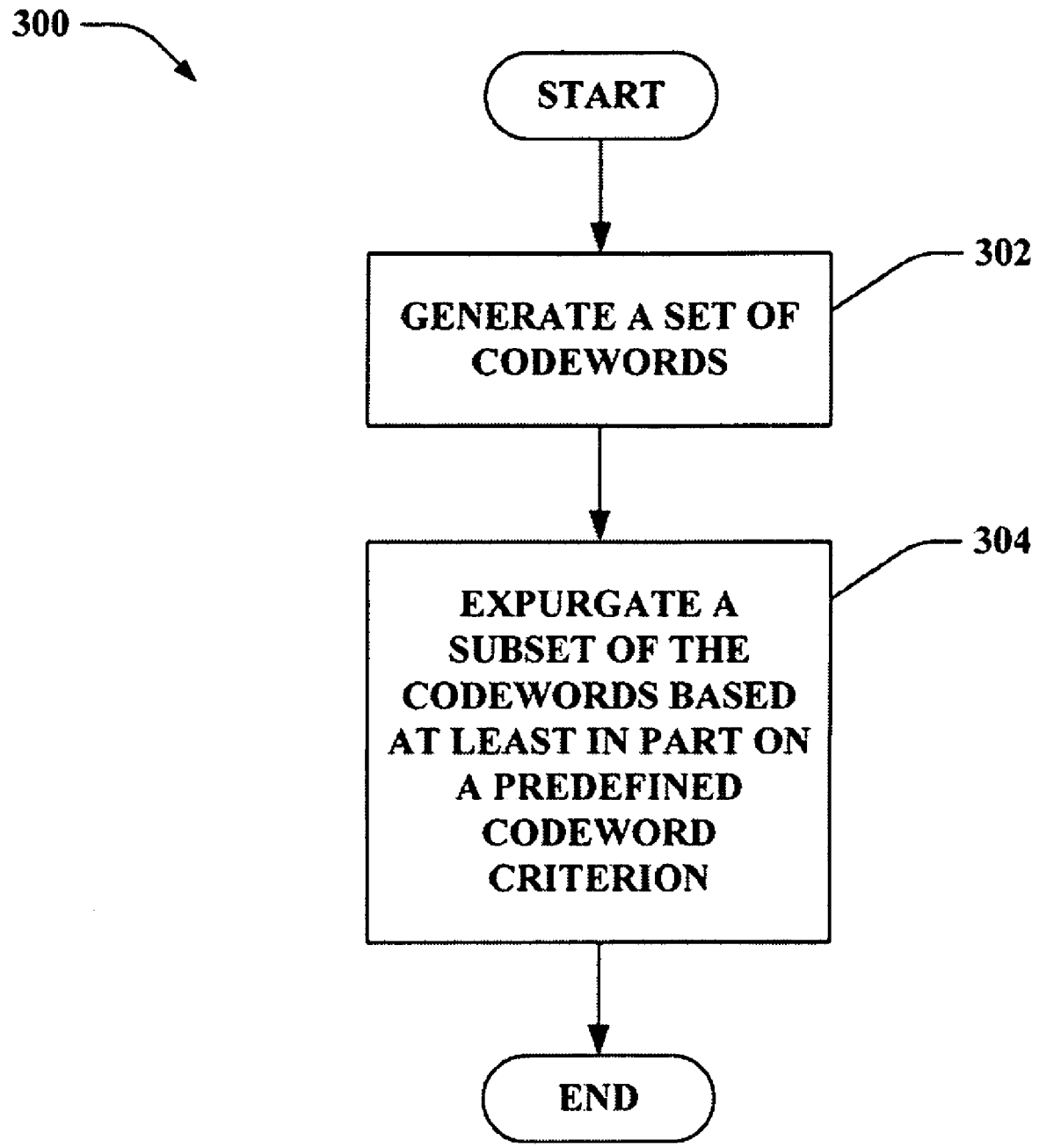
FIG. 3 is an illustration of an example methodology that can facilitate transmission of information within a wireless communication environment.

With reference to FIG. 3, illustrated is a methodology 300 that can facilitate transmitting information (e.g., control channel information) associated with a wireless communication system. At 302, a set of codewords can be generated. In one aspect, the codewords can be generated to facilitate transmission of control channel information between a transmitting communication device (e.g., mobile device 116) and a receiving communication device (e.g., base station 102). In another aspect, the codewords can be designed based on BPSK or QPSK to facilitate bandwidth efficient non-coherent signaling. For example, to facilitate bandwidth efficiency, complex orthogonal modulation can be utilized and high order modulation (e.g., QPSK) for non-coherent signal related to control channel transmission can be employed to facilitate reducing the number of tones used to transmit the control channel information.

At 304, a subset(s) of the codewords can be expurgated based at least in part on a predefined codeword criterion (e.g., as more fully described herein). For instance, a set of codewords can be generated, where some of the codeword pairs in the set can produce a worst-case cross-correlation value (e.g., $1/\sqrt{2}$) that is undesirable for transmission of control channel information. In accordance with an aspect, a subset of codewords with poor or otherwise undesirable correlation values, such as codeword pairs producing a worst-case cross-correlation value of $1/\sqrt{2}$, can be expurgated.

In yet another aspect, another subset of codewords can be expurgated and discarded such that enough codewords remain in the set to meet the desired spectral efficiency (e.g., the predetermined threshold number of valid codewords desired for a given number of tones). The remaining codewords in the set can be selected and utilized to facilitate transmission of control channel information (e.g., CQICH). The discarded codewords, or a portion thereof, can be utilized for other purposes, such as estimating the interference level, erasure detection, and/or transmitting other control information (e.g., PMICH, SRCH, etc.), for example. For instance, by partitioning the designed codeword into multiple subsets of codewords, the complex orthogonal code can be utilized for one or more control channels, such as CQICH, PMICH, and/or SRCH, to further improve bandwidth efficiency.

Figure 4:
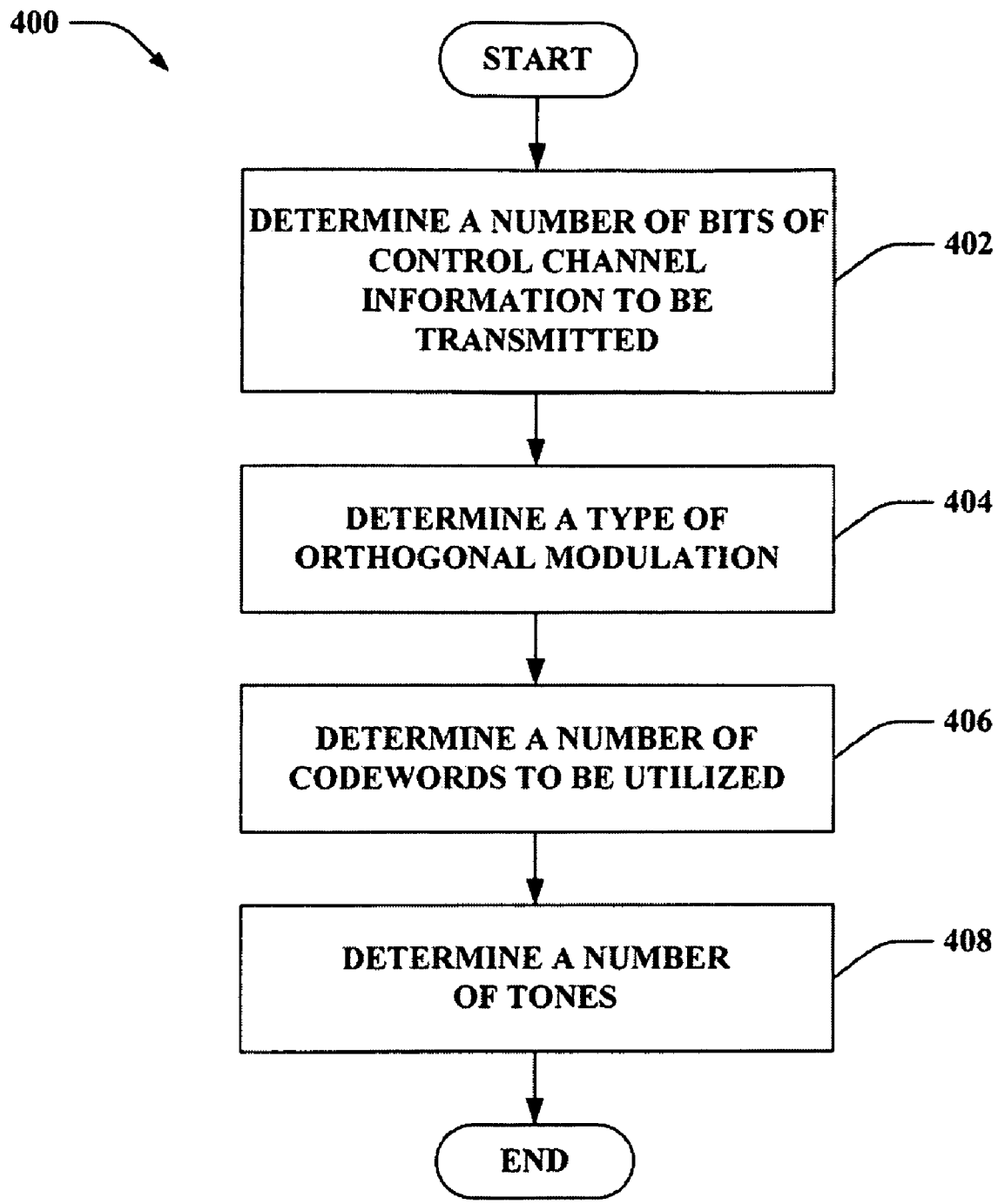
FIG. 4 is an illustration of an example methodology that can facilitate generating codewords to facilitate transmitting information associated with a wireless communication system.

With reference to FIG. 4, illustrated is a methodology 400 that can facilitate generating codewords to facilitate transmission of information (e.g., control channel information) associated with a wireless communication system. At 402, a number of bits of control channel information to be transmitted can be determined. In one aspect, the number of bits of control channel information (e.g., CQICH) to be transmitted between a transmitting communication device (e.g., mobile device 116) and a receiving communication device (e.g., base station 102) can be determined. At 404, a type of orthogonal modulation to be utilized to facilitate transmission can be determined. For instance, a determination can be made regarding whether to use BPSK or a high order modulation (e.g., QPSK) to facilitate transmission of control channel information and/or other information between communication devices, for example, based at least in part on the number of bits of information to be transmitted and/or the available bandwidth.

At 406, the number of codewords to be utilized can be determined. In one aspect, the number of codewords desired to facilitate transmission of certain control channel information (e.g., CQICH) and/or for use for other purposes (e.g., transmission of other control channel information, interference-level estimation, erasure decoding, etc.) can be determined. Such determination can be based at least in part on the number of bits of information to be transmitted between communication devices, for example. In another aspect, a first subset of codewords, where each codeword pair produces a desired (e.g., good) cross-correlation property, can be utilized to facilitate transmission of certain control channel information (e.g., CQICH). Another subset of codewords, which can include codeword pairs that produce an undesirable cross-correlation property (e.g., worst-case cross-correlation value of $1/\sqrt{2}$) can be expurgated. In accordance with one embodiment, the designed codeword set can be an expurgation-based complex orthogonal code (and/or expanded expurgation-based orthogonal code) that can be structured such that the worst-case cross-correlation between any two expurgation-based complex orthogonal sequences is ½ (as opposed to $1/\sqrt{2}$) by employing a codeword expurgation condition, $c_{m(k)} \neq c_{n(k)}, \forall k$, so that the conditions 1 and 2 associated with Equations 4a and 4b, as described herein, cannot be satisfied. As a result, there will be no codeword pairs producing a worst-case cross-correlation value of $1/\sqrt{2}$.

In another aspect, there can also be one or more other subsets of codewords that can be expurgated and discarded such that the number of codewords in the first set of codewords is a desired number (e.g., predetermined threshold number) of codewords to meet the desired spectral efficiency (e.g., the desired number of valid codewords for a given number of tones). The subset(s) of discarded codewords can be utilized for other purposes, such as erasure decoding, interference-level estimation, and/or multi-mode control channel operation, etc., as desired.

At 408, the number of tones can be determined. In one aspect, the number of tones (e.g., QPSK tones) can be determined based at least in part on the number of bits of information to be transmitted between communication devices and/or the type of code (e.g., Hadamard code) utilized for the codeword design.

Figure 5:
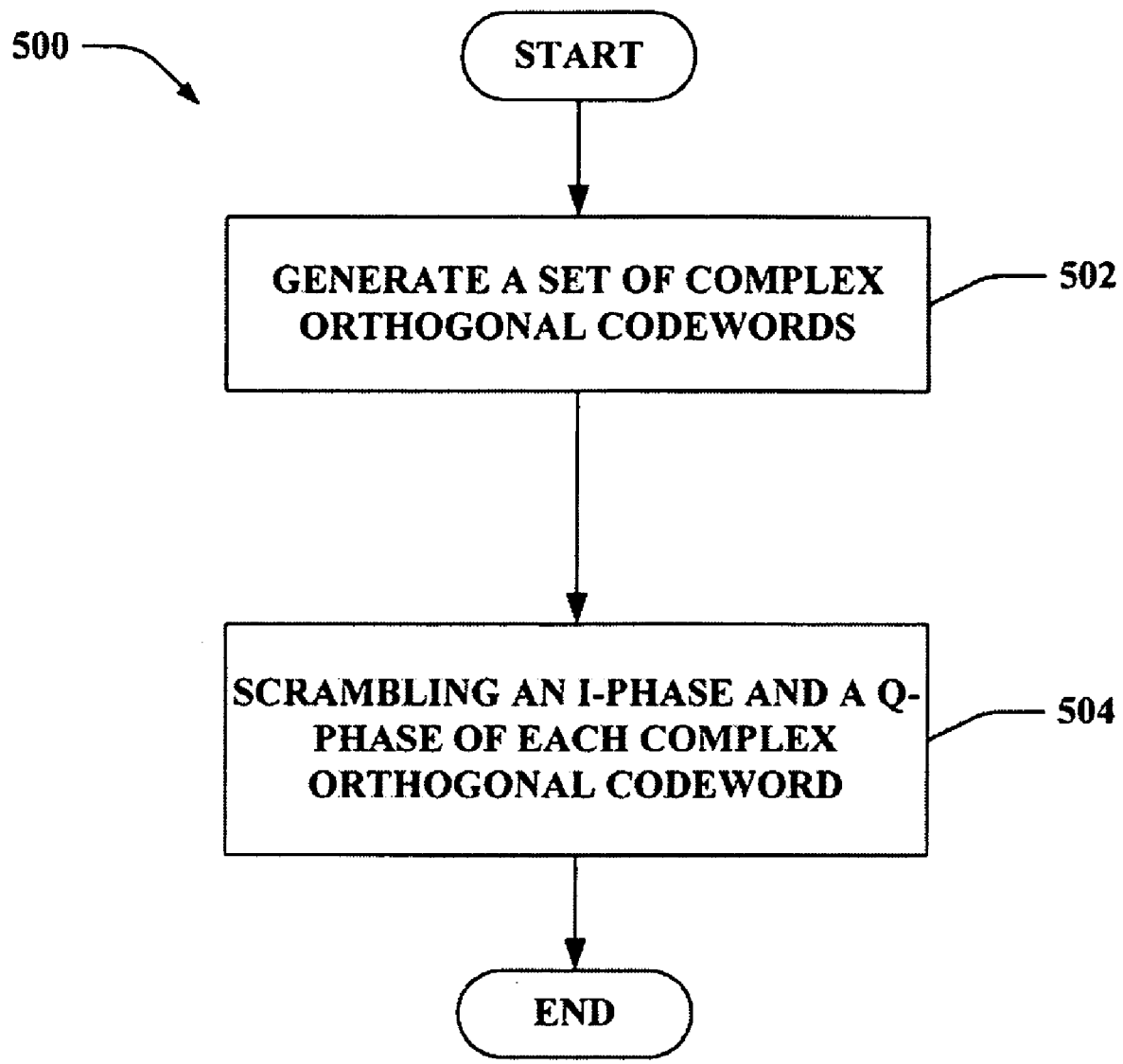
FIG. 5 is an illustration of an example methodology that can employ scrambling to facilitate transmitting information associated with a wireless communication system.

Turning to FIG. 5, illustrated is a methodology 500 that can employ scrambling to facilitate transmitting information (e.g., control channel information) associated with a wireless communication system. At 502, a set of complex orthogonal codewords can be generated. In one aspect, a set of complex orthogonal codewords can be generated based at least in part on a predefined codeword criterion (e.g., as more fully described herein). The complex orthogonal codewords can be designed, generated, and employed to facilitate the transmission of information, such as certain control channel information (e.g., CQICH) and/or other information (e.g., information related to erasure decoding, interference-level estimation, other control channel information), from a transmitting communication device (e.g., mobile device 116) to a receiving communication device (e.g., base station 102). In another aspect, each of the complex orthogonal codewords can include an I-phase and a Q-phase. At 504, the I-phase and Q-phase of each codeword of the set of complex orthogonal codewords can be scrambled independently, where, for instance, a first scrambling code can be utilized for the I-phase and another scrambling code can be utilized for the Q-phase. In one aspect, to facilitate reducing the peak cross-correlation of the complex orthogonal modulation in the non-coherent receiver, independent real scrambling code can be applied for the I-phase and Q-phase of each codeword in the codeword set, such as more fully described supra. In accordance with another aspect, the codewords can be further scrambled by using a transmitting communication device (e.g., mobile device 116) specific complex PN sequence of predetermined length (e.g., length determined based at least in part on the number of tones) in order to provide a better autocorrelation in the multipath channel.

Figure 6:
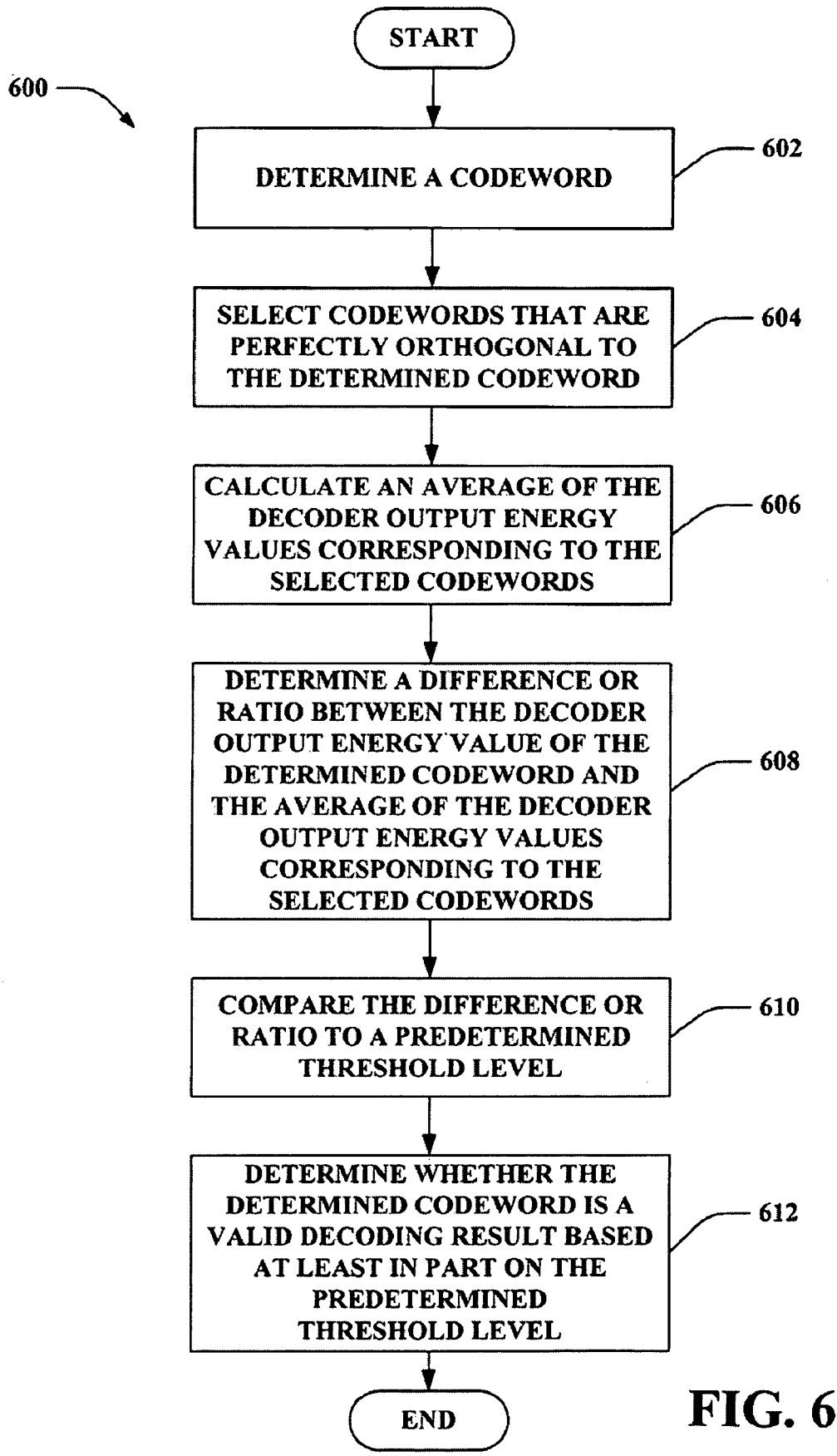
FIG. 6 is an illustration of an example methodology that can facilitate erasure decoding to facilitate transmission of information associated with a wireless communication system.

With reference to FIG. 6, illustrated is a methodology 600 that can facilitate erasure decoding to facilitate transmission of information (e.g., control channel information) associated with a wireless communication system. At 602, the codeword can be determined. In one aspect, the codeword can be determined to facilitate erasure decoding related to non-coherent signaling in order to facilitate transmission of information between a transmitting communication device (e.g., mobile device 116) and a receiving communication device (e.g., base station 102). In another aspect, the codeword can be determined by ML decoding, such as more fully described herein, for example, with regard to Equations (2)-(3) as described with respect to system 100. At 604, codewords that are perfectly orthogonal (e.g., zero cross-correlation) to the determined codeword can be selected. At 606, the average of the decoder output energy values corresponding to the selected codewords can be calculated. At 608, the difference (or, alternatively, the ratio) between the energy value of the determined codeword and the calculated average output energy values corresponding to the selected codewords can be determined. At 610, the metric (e.g., the determined difference or ratio between the energy value of the determined codeword and the calculated average output energy values corresponding to the selected codewords) can be compared to a predetermined threshold level related to the validity of a decoding result. At 612, a determination can be made regarding whether the determined codeword is a valid decoding result based at least in part on the predetermined threshold level. For instance, if the metric is equal or greater than the predetermined threshold level, the determined codeword can be determined to be a valid decoding result; if the metric is less than the predetermined threshold level, an erasure can be declared with respect to the determined codeword.

Figure 7:
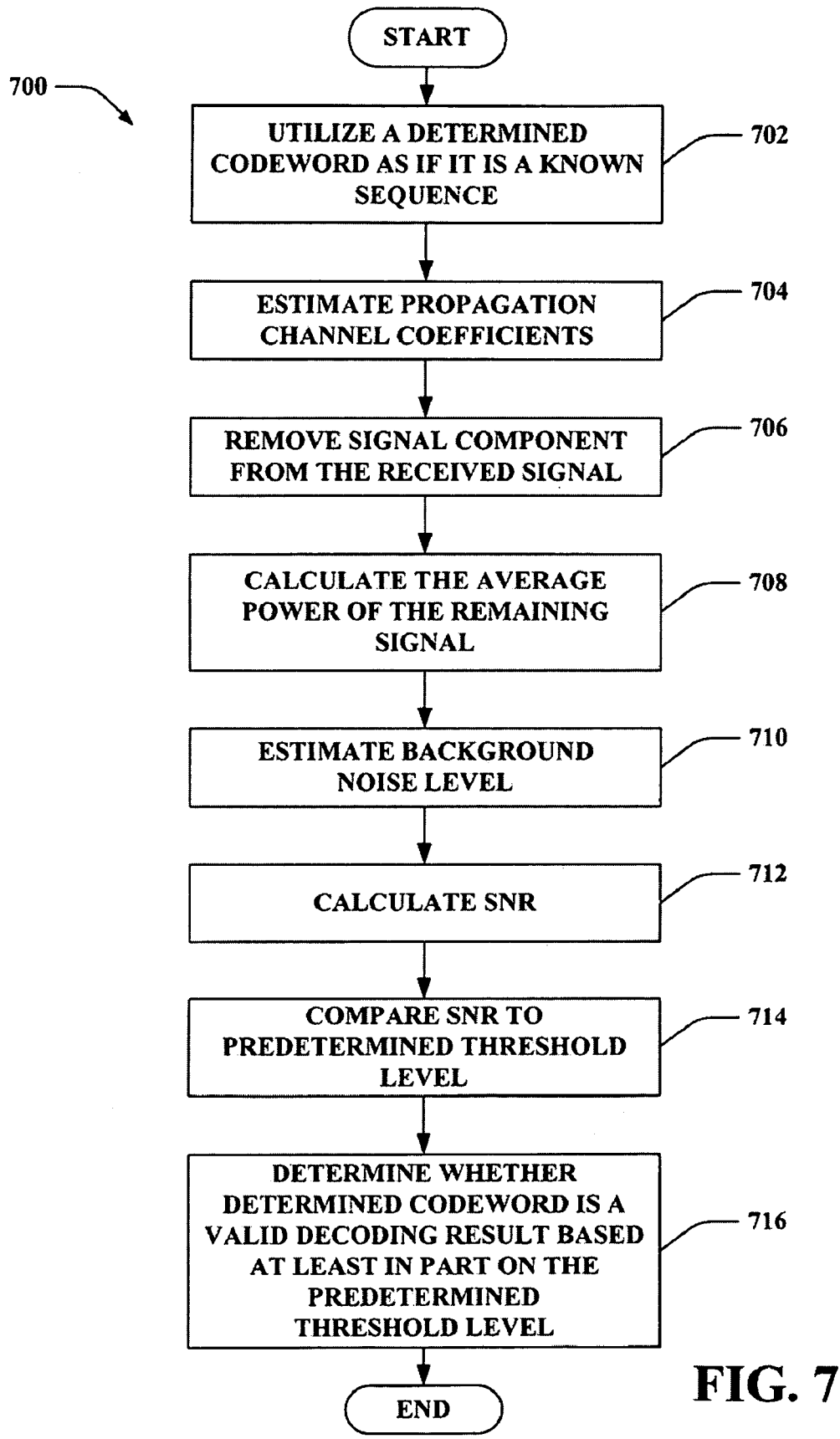
FIG. 7 is an illustration of another example methodology that can facilitate erasure decoding to facilitate transmission of information associated with a wireless communication system.

Turning to FIG. 7, illustrated is another methodology 700 that can facilitate erasure decoding to facilitate transmission of information (e.g., control channel information) associated with a wireless communication system. In one aspect, erasure decoding can be applied to non-coherent signaling in order to facilitate transmission of information between a transmitting communication device (e.g., mobile device 116) and a receiving communication device (e.g., base station 102). At 702, determined codeword can be utilized as if it was a known sequence. At 704, the propagation channel coefficients can be estimated based at least in part on the determined codeword (e.g., with an assumption that the decoding is correct). At 706, the signal component corresponding to the determined codeword can be removed from the received signal. In one aspect, a signal can be transmitted from one communication device (e.g., mobile device 116) to another communication device (e.g., base station 102). The signal component of a received signal can be removed (e.g., subtracted) from the received signal. At 708, the average power of the remaining signal (e.g., signal remaining after signal component is removed from the received signal) can be calculated. At 710, the background noise level can be estimated based at least in part on the average power value of the remaining signal. It is noted that the background noise level will be high is the decoding is incorrect. At 712, the SNR can be calculated based at least in part on the propagation channel estimation and background noise level estimation. For instance, the propagation channel estimation and background noise level estimation can be utilized to calculate the SNR. At 714, the SNR value can be compared to a predetermined threshold level related to the validity of the decoding result. At 716, a determination can be made regarding whether the determined codeword is a valid decoding result based at least in part on the predetermined threshold level. For instance, if it is determined that the SNR value is equal to or greater than the predetermined threshold level, the determined codeword can be determined to be a valid decoding result; and, if the SNR value is less than the predetermined threshold level, an erasure can be declared, and thus, the determined codeword can be determined to not be a valid decoding result.

It will be appreciated that, in accordance with one or more aspects described herein, inferences can be made regarding designing, generating, selecting, expurgating, and/or utilizing codewords to facilitate transmission of information (e.g., control channel, erasure decoding, interference-level estimation, etc.). As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to designing and/or generating codewords associated with orthogonal modulation (e.g., binary orthogonal modulation, complex orthogonal modulation, expurgation-based complex orthogonal modulation, expanded expurgation-based complex orthogonal modulation, etc.) to facilitate transmitting information (e.g., control channel information, information related to erasure decoding, information related to interference-level estimation, etc.) between communication devices (e.g., mobile device 116, base station 102). By way of further illustration, an inference(s) can be made related to determining a type of orthogonal modulation is most bandwidth efficient to transmit a given amount of information between communication devices; and/or determining whether to expurgate a particular codeword from a set of codewords and/or which codeword(s) to expurgate from a set of codewords. It will be appreciated that the foregoing examples are illustrative in nature and are not intended to limit the number of inferences that can be made or the manner in which such inferences are made in conjunction with the various embodiments and/or methods described herein.

Figure 8:
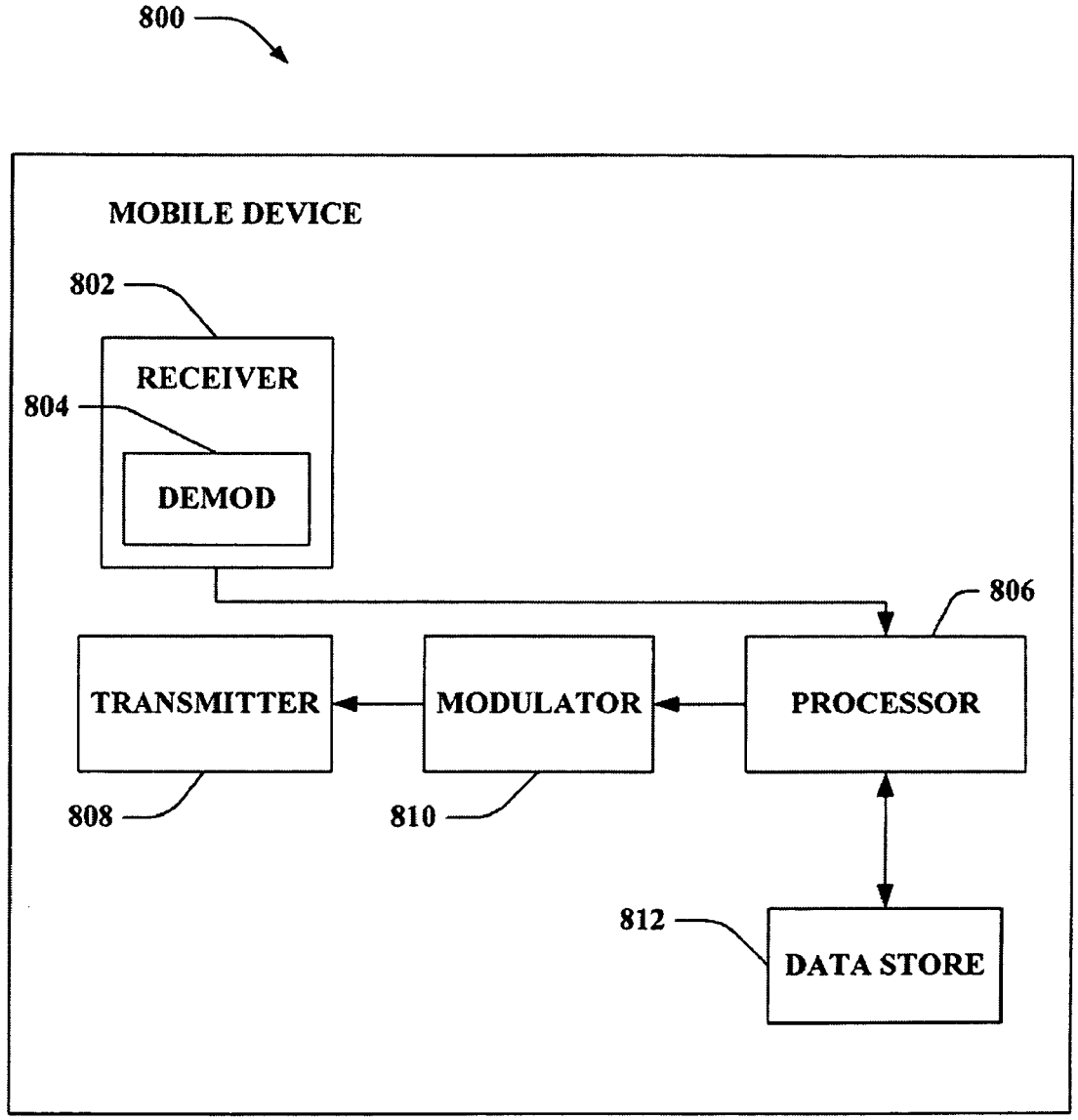
FIG. 8 is an illustration of an example mobile device that can facilitate transmission or reception of information associated with a wireless communication system.

FIG. 8 is an illustration of a mobile device 800 that can facilitate transmission or reception of information (e.g., control channel information) associated with a wireless communication system. Mobile device 800 can comprise a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. In one aspect, the demodulator 804 can be configured to demodulate received symbols that have been BPSK or QPSK modulated, for instance, as more fully described supra. Processor 806 can be a processor dedicated to analyzing information received by receiver 802 and/or generating information for transmission by a transmitter 808, a processor that controls one or more components of mobile device 800, and/or a processor that both analyzes information received by receiver 802, generates information for transmission by transmitter 808, and controls one or more components of mobile device 800. Mobile device 800 can also comprise a modulator 810 that can work in conjunction with the transmitter 808 to facilitate transmitting signals (e.g., data) to, for instance, a base station 102, another mobile device, etc. In one aspect, the modulator 810 can be configured to modulate signals, for example, employing BPSK or QPSK modulation, to facilitate transmitting control channel information and/or other information to another communication device, such as a base station 102, another mobile device, etc. The mobile device 800 can include the same or similar functionality as a communication device, such as more fully described herein, for example, with regard to system 100.

Mobile device 800 can additionally comprise data store 812 that can be operatively coupled to processor 806 and can store data to be transmitted, received data, information related to the transmission or reception of control channel information (e.g., information related to complex orthogonal modulation, expurgation-based complex orthogonal modulation, and/or expanded expurgation-based complex orthogonal modulation, etc.), information relevant to erasure decoding and/or interference-level estimation, and any other suitable information that can facilitate transmission and/or reception of information, such as control channel information, between communication devices, such as a mobile device 800 and a base station 102. Data store 812 can additionally store protocols and/or algorithms associated with orthogonal modulation (e.g., binary orthogonal modulation, complex orthogonal modulation, expurgation-based complex orthogonal modulation, and/or expanded expurgation-based complex orthogonal modulation, etc.) and/or codewords.

It will be appreciated that the data store 812 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 812 is intended to comprise, without being limited to, these and any other suitable types of memory.

Figure 9:
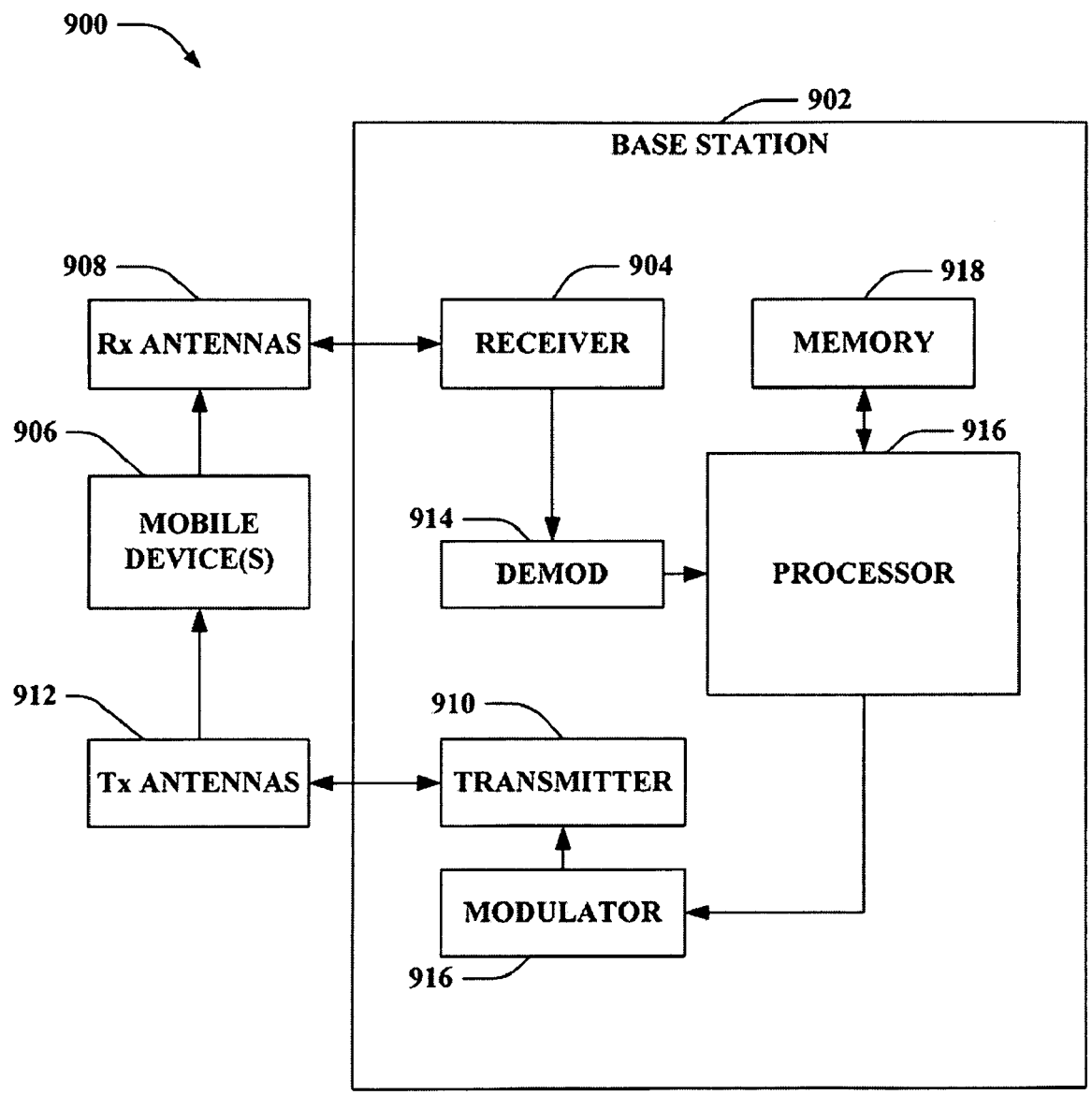
FIG. 9 is an illustration of an example system that can facilitate transmission or reception of information associated with a wireless communication system.

FIG. 9 is an illustration of a system 900 that can facilitate transmission or reception of information (e.g., control channel information) associated with a wireless communication system. System 900 can comprise a base station 902 (e.g., access point, . . . ) with a receiver 904 that can receive signal(s) from one or more mobile devices 906 (e.g., having same or similar functionality as mobile device 116 and/or mobile device 800) through a plurality of receive antennas 908, and a transmitter 910 that can transmit signals (e.g., data) to the one or more mobile devices 906 through a transmit antenna 912. Receiver 904 can receive information from receive antennas 908 and can be operatively associated with a demodulator 914 that can demodulate received information. In one aspect, the demodulator 914 can be configured to demodulate received symbols that have been BPSK or QPSK modulated, for instance, as more fully described supra. Demodulated symbols can be analyzed by a processor 916 that can be a processor dedicated to analyzing information received by receiver 904 and/or generating information for transmission by a transmitter 910, a processor that controls one or more components of base station 902, and/or a processor that both analyzes information received by receiver 904, generates information for transmission by transmitter 910, and controls one or more components of base station 902.

The base station 902 can also comprise a modulator 916 that can work in conjunction with the transmitter 910 to facilitate transmitting signals (e.g., data) to, for instance, a mobile device 906, another device, etc. In one aspect, the modulator 916 can be configured to modulate signals, for example, employing BPSK or QPSK modulation, to facilitate transmitting control channel information and/or other information to another communication device, such as a mobile device(s) 906, another mobile device, etc. The base station 902 and mobile device(s) 906 each can include the same or similar functionality as a communication device, such as more fully described herein, for example, with regard to system 100.

Processor 916 can be coupled to a memory 918 that can store information related to data to be transmitted, received data, information related to the transmission or reception of control channel information (e.g., information related to complex orthogonal modulation, expurgation-based complex orthogonal modulation, and/or expanded expurgation-based complex orthogonal modulation, etc.), information relevant to erasure decoding and/or interference-level estimation, and any other suitable information that can facilitate determining transmission of information (e.g., control channel information) between communication devices. Memory 918 can additionally store protocols and/or algorithms associated with orthogonal modulation (e.g., binary orthogonal modulation, complex orthogonal modulation, expurgation-based complex orthogonal modulation, and/or expanded expurgation-based complex orthogonal modulation, etc.) and/or codewords.

It will be appreciated that the memory 918 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 918 is intended to comprise, without being limited to, these and any other suitable types of memory.

Figure 10:
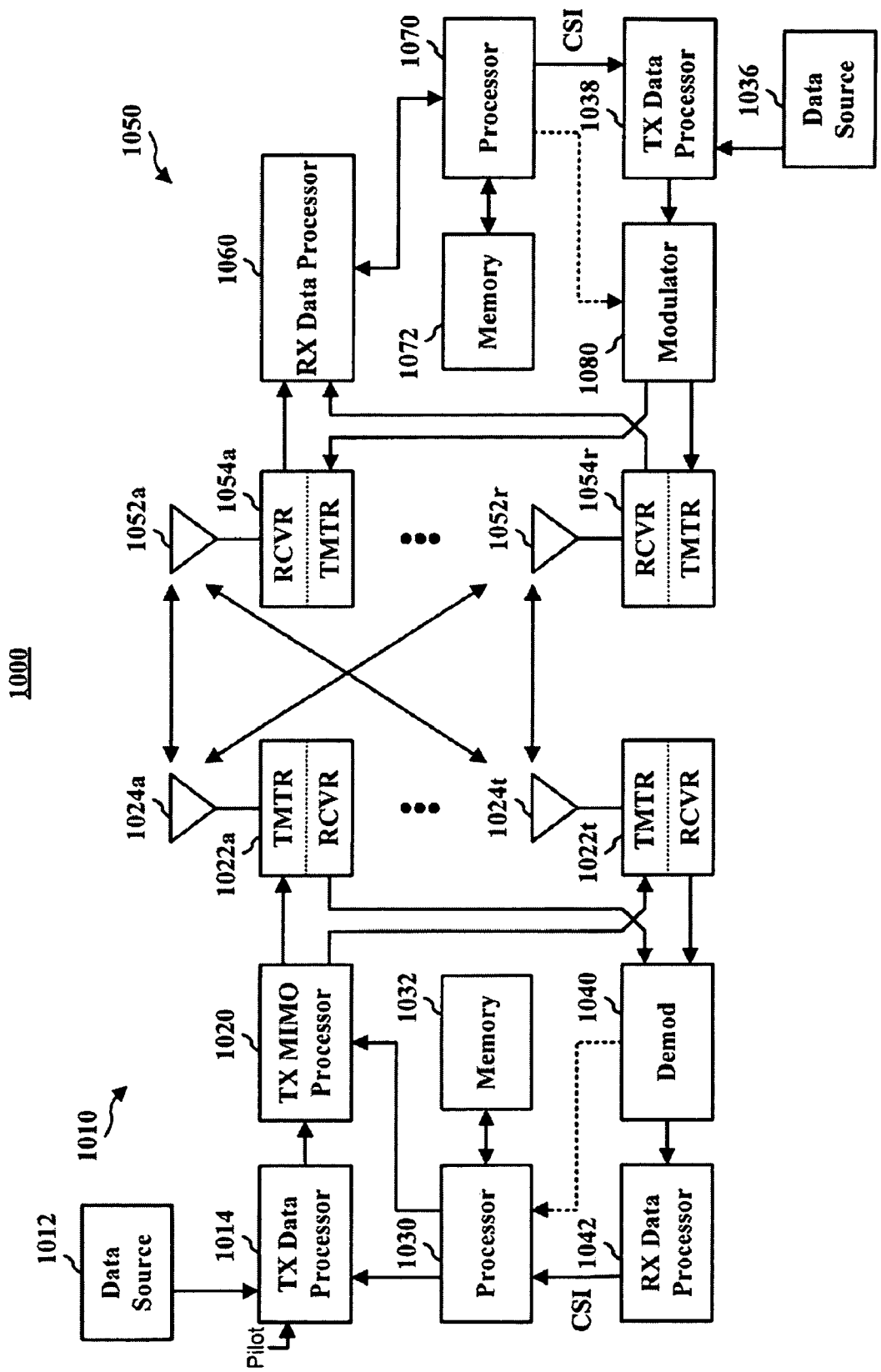
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-2, 8-9, and 11-12) and/or methods (FIGS. 3-7) described herein to facilitate wireless communication there between. It is to be appreciated that base station 1010 and mobile device 1050 each can be respectively the same or similar as, and/or can comprise respectively the same or similar functionality as, respective components as more fully described herein, such as, for example, with regard to system 100, system 200, system 800, and/or system 900.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to use (discussed below). Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message and can determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
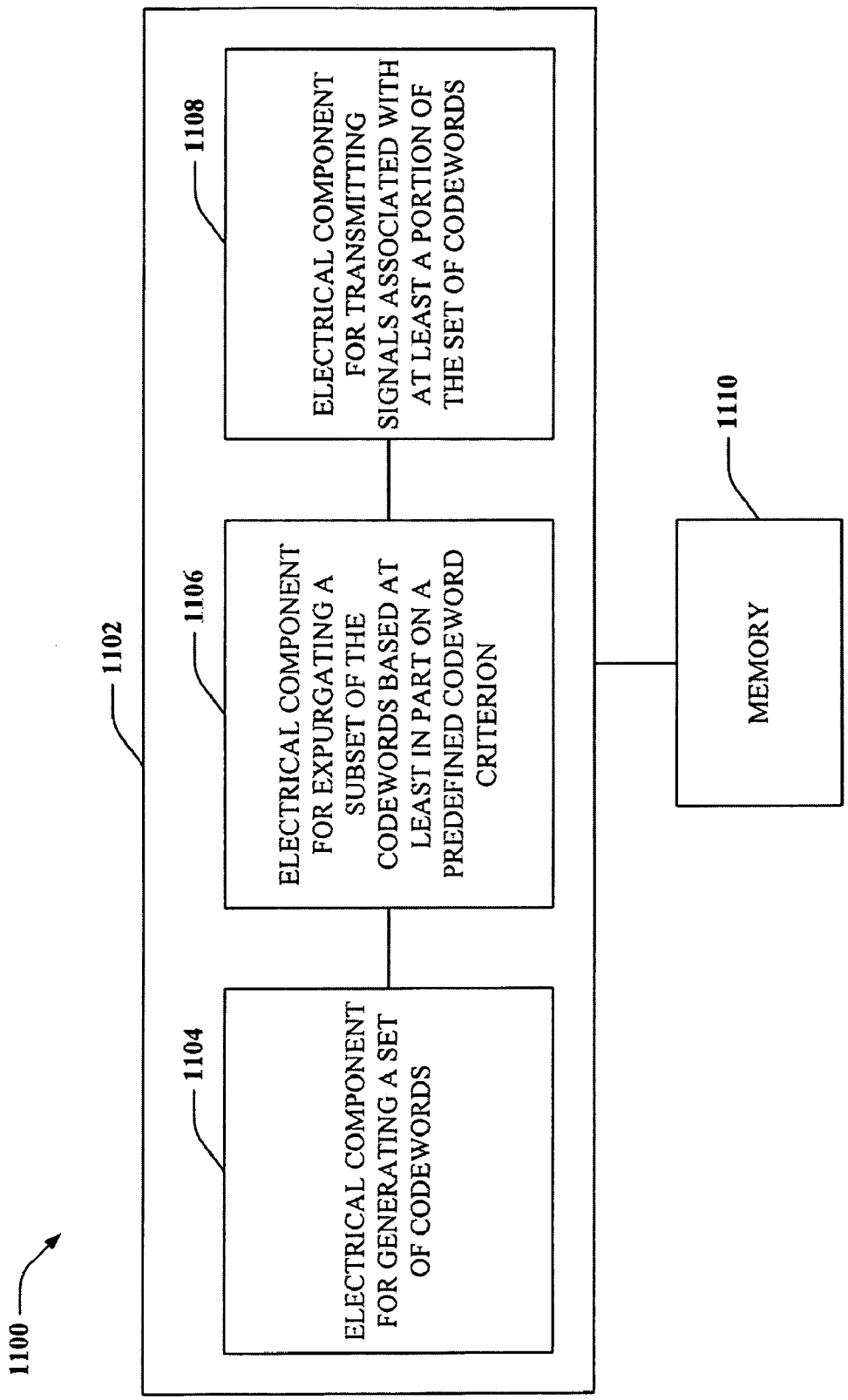
FIG. 11 is an illustration of an example system that can facilitate transmission of information between communication devices associated with a wireless communication environment.

With reference to FIG. 11, illustrated is a system 1100 that can facilitate transmission of information (e.g., control channel information) between communication devices associated with a wireless communication environment. For example, system 1100 can reside at least partially within a communication device, such as a mobile device (e.g., 116). It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction.

For instance, logical grouping 1102 can include an electrical component for generating a set of codewords 1104. In one aspect, the set of codewords can be generated to facilitate the transmission of information, such as control channel information, between communication devices, such as a mobile device 116 and a base station 102. In another aspect, the codeword structure can relate to orthogonal modulation (e.g., binary orthogonal modulation, complex orthogonal modulation, expurgation-based complex orthogonal modulation, expanded expurgation-based complex orthogonal modulation) for non-coherent signaling. Further, logical grouping 1102 can comprise an electrical component for expurgating a subset(s) of codewords from the set of codewords based at least in part on a predefined codeword criterion 1106. For example, a subset of codewords can include codeword pairs producing a worst-case cross-correlation value, such as $1/\sqrt{2}$, and such codeword pairs can be expurgated, which can improve the worst-case cross correlation between the remaining respective pairs of codewords. In accordance with one embodiment, the codeword set can be designed as an expurgation-based complex orthogonal code (and/or expanded expurgation-based orthogonal code) that can be structured such that the worst-case cross-correlation between any two expurgation-based complex orthogonal sequences is ½ (as opposed to $1/\sqrt{2}$) by employing a codeword expurgation condition, $c_{m(k)} \neq c_{n(k)}, \forall k$, so that the conditions 1 and 2 associated with Equations 4a and 4b, as described herein, cannot be satisfied. As a result, there will be no codeword pairs producing a worst-case cross-correlation value of $1/^o\sqrt{2}$.

As another example, another subset of codewords can be codewords that can be expurgated and discarded such that the number of codewords remaining in the set of codewords to be used to facilitate transmission of certain control information (e.g., CQICH) is a number (e.g., predetermined threshold number) of codewords desired to meet the desired spectral efficiency (e.g., the desired number of valid codewords for a given number of tones). The discarded words, or a portion thereof, can be employed for other purposes, such as interference-level estimation, erasure detection, etc., as desired. As a result, transmission of information, such as control channel information, employing high order modulation (e.g., QPSK) for non-coherent signaling can be realized in a bandwidth-efficient manner. Also, logical grouping 1102 can include an electrical component for transmitting signals associated with at least a portion of the set of codewords 1108. In one aspect, the signals can be transmitted employing non-coherent signaling using a set of complex orthogonal codewords (e.g., complex orthogonal codewords, expurgation-based complex orthogonal codewords, expanded expurgation-based complex orthogonal codewords), where the signals can be transmitted from one communication device (e.g., mobile device 116) to another communication device (e.g., base station 102). In another aspect, the portion of the set of the codewords can include select codewords in the set of codewords that contain a desired (e.g., good) cross-correlation property (e.g., codewords associated with a cross-correlation value of ½ or less), where the select codewords can be utilized to facilitate transmitting control channel information (e.g., CQICH). In still another aspect, the portion of the set of the codewords can comprise discarded codewords, and the discarded codewords, or a portion thereof, where such discarded codewords can be utilized to facilitate erasure decoding, interference-level estimation, multi-mode control channel operation to facilitate transmission of other control information (e.g., PMICH, SRCH, etc.), and/or for other desired purposes. Additionally, system 1100 can include a memory 1110 that can retain instructions for executing functions associated with electrical components 1104, 1106, and 1108. While shown as being external to memory 1110, it is to be understood that one or more of electrical components 1104, 1106, and 1108 can exist within memory 1110.

Figure 12:
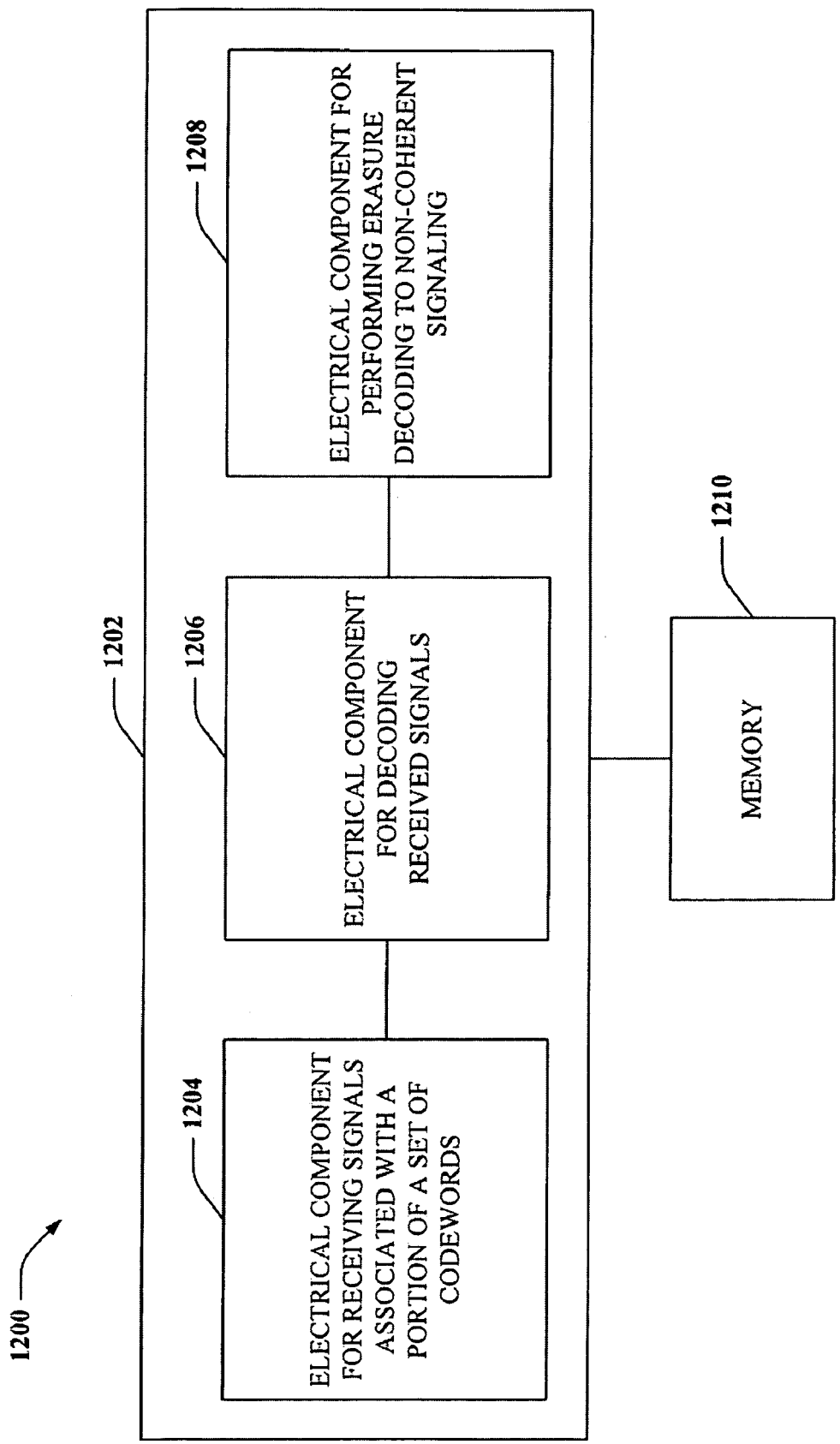
FIG. 12 is an illustration of an example system that can facilitate transmission of information between communication devices associated with a wireless communication environment.

Turning to FIG. 12, illustrated is a system 1200 that can facilitate transmission of information (e.g., control channel information) between communication devices associated with a wireless communication environment. System 1200 can reside at least partially within a communication device, such as a base station 102, for instance. As depicted, system 1200 includes functional blocks that can represent functions implemented by a processor, software, or combination thereof (e.g., firmware). System 1200 includes a logical grouping 1202 of electrical components that can act in conjunction. Logical grouping 1202 can include can include an electrical component for receiving signals associated with a portion of the set of codewords 1204. In one aspect, the received signals can be non-coherent signaling related to control channel information being transmitted from one communication device (e.g., mobile device 116) to another communication device (e.g., base station 102). In another aspect, the codeword structure can relate to orthogonal modulation (e.g., binary orthogonal modulation, complex orthogonal modulation, expurgation-based complex orthogonal modulation, expanded expurgation-based complex orthogonal modulation) for non-coherent signaling. In still another aspect, the portion of the set of the codewords can include select codewords which can be codewords that have a desirable cross-correlation property and can be utilized to facilitate transmission and reception of certain control information (e.g., CQICH) and/or other information. In one aspect, the portion of the set of the codewords can be designed such that codewords pairs producing worst-case cross-correlation can be expurgated from the portion of the set of the codewords, so that such worst-case codewords are not part of the portion of the set of the codewords received. In yet another aspect, the portion of the set of the codewords can also include discarded codewords, where such discarded codewords can be employed for other purposes, such as to facilitate erasure decoding, interference-level estimation, multi-mode control channel operation, and/or other desired purposes.

Further, logical grouping 1202 can comprise an electrical component for decoding a received signal 1206. Moreover, logical grouping 1202 can include an electrical component for performing erasure decoding to non-coherent signaling 1208. The erasure decoding can be performed in virtually any of a variety of ways, for example, such as more fully described supra. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates transmission of information, comprising:
   generating a set of codewords to facilitate transmission of information comprising control channel information; and
   expurgating a subset of the codewords based at least in part on a predefined codeword criterion, wherein expurgating the subset of the codewords comprises worst-case codewords from the set of codewords to create a bandwidth-efficient non-coherent signaling set of codewords that have a predefined cross-correlation property, wherein the set of codewords is complex orthogonal code.

2. The method of claim 1, the predefined codeword criterion relates to at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

3. The method of claim 1, each codeword in the generated set of codewords is a complex orthogonal codeword.

4. The method of claim 3, further comprising scrambling an in-phase and a quadrature-phase of each codeword in the generated set of codewords, wherein the scrambling of the in-phase is performed using a first sequence and the scrambling of the quadrature-phase is performed using a disparate sequence.

5. The method of claim 3, further comprising scrambling each codeword in the generated set of codewords utilizing a communication device-specific complex pseudo-random noise sequence of a predetermined length.

6. The method of claim 1, expurgating a subset of the codewords based at least in part on a predefined codeword criterion further comprises expurgating codeword pairs that have a worst-case cross-correlation value.

7. The method of claim 6, wherein the worst-case cross correlation value is $1/\sqrt{2}$.

8. The method of claim 1, further comprising structuring the generated set of codewords based at least in part on a complex orthogonal modulation.

9. The method of claim 1, further comprising:
determining a number of bits of control channel information to be transmitted;
determining an available bandwidth;
determining a type of orthogonal modulation;
determining a number of codewords to be utilized to facilitate at least one other operation; and
determining a number of tones.

10. The method of claim 1, expanding the generated set of codewords, $S_k$, by adding another set of codewords, $\overline{S}_k$, to the generated set of codewords, wherein $S_k$ is orthogonal to $\overline{S}_k$ and the other set of codewords, $\overline{S}_k$, is obtained by swapping the in-phase and the quadrature-phase of each of the complex codewords, $S_k$, except for the potential complex scrambling part commonly applied to all the codewords.

11. The method of claim 1, further comprising:
transmitting control channel information using a subset of codewords that do not produce a worst-case cross-correlation value;
using a portion of the expurgated codewords for at least one other operation, the at least one other operation, comprises at least one of interference-level estimation, erasure detection, or a multi-mode control channel transmission, or a combination thereof, wherein the portion of the expurgated codewords are discarded codewords that are selected such that there is not an increase in the maximum cross-correlation value of the subset of codewords when operated together.

12. The method of claim 1, the predefined cross-correlation property relates to a correlation value of ½.

13. The method of claim 1, the complex orthogonal code is expurgation-based complex orthogonal code or expanded expurgation-based complex orthogonal code.

14. The method of claim 1, further comprising:
partitioning the set of codewords into multiple subsets of codewords;
utilizing a first subset of codewords to facilitate transmitting a first type of control channel information; and
utilizing at least one other subset of codewords, comprising discarded codewords, to facilitate at least one of erasure decoding, estimating an interference level, or transmitting at least one other type of control channel information, or a combination thereof, to facilitate improving bandwidth efficiency.

15. The method of claim 14, the first type of control channel information comprising Channel Quality Indicator Channel (CQICH), and the at least one other type of control channel information comprising at least one of Precoding Matrix Indicator Channel (PMICH) or Scheduling Request Channel (SRCH), or a combination thereof.

16. An electronic device configured to execute the method of claim 1.

17. A wireless communications apparatus, comprising:
a memory that retains instructions related to transmitting information using codewords generated based at least in part on a predefined codeword criterion; and
a processor, coupled to the memory, configured to execute the instructions retained in the memory.

18. The wireless communications apparatus of claim 17, wherein the predefined codeword criterion relates to at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

19. The wireless communications apparatus of claim 17, wherein the memory further retains instructions related to complex orthogonal modulation associated with the generated codewords.

20. The wireless communications apparatus of claim 17, wherein the memory retains instructions related to a first subset of generated codewords that do not produce a worst-case cross-correlation property and at least one other set of generated codewords that includes expurgated codewords comprising at least one of discarded codewords or codewords that produce a worst-case cross-correlation property, or a combination thereof, wherein each generated codeword is a complex orthogonal codeword.

21. The wireless communications apparatus of claim 20, the at least one other set of generated codewords includes generated codewords that are expurgated based at least in part on the predefined codeword criterion.

22. The wireless communications apparatus of claim 20, wherein the predefined codeword criterion specifies that generated codeword pairs that produce a worst-case cross correlation property of $1/\sqrt{2}$ are to be expurgated.

23. An apparatus, comprising:

a codeword generator that generates codewords based at least in part on a predefined codeword criterion to facilitate transmission of information comprising control channel information; and an expurgator that expurgates codewords based at least in part on a predefined codeword criterion, wherein the expurgated codewords are complex orthogonal codewords that are expurgation-based complex orthogonal code or expanded expurgation-based complex orthogonal code.

24. The apparatus of claim 23, the expurgator facilitates structuring at least one of the expurgation-based complex orthogonal code or the expanded expurgation-based orthogonal code such that the cross-correlation between any two expurgated complex orthogonal sequences is ½ or less by employing a codeword expurgation condition, $c_{m(k)} \neq c_{n(k)}, \forall k$, where $c_{m(k)}$ and $c_{n(k)}$ are mutually orthogonal binary sequences used for an in-phase and a quadrature-phase of the $k^{th}$ complex orthogonal codeword.

25. The apparatus of claim 23, the codeword generator and the expurgator work in conjunction to facilitate expansion of a set of generated codewords, $S_k$, by adding another set of codewords, $\overline{S}_k$, to the set of generated codewords, wherein $S_k$ is orthogonal to $\overline{S}_k$ and the other set of codewords, $\overline{S}_k$, is obtained by swapping the in-phase and the quadrature-phase of each of the complex codewords, $S_k$, except for the potential complex scrambling part commonly applied to all the codewords.

26. The apparatus of claim 23, wherein the predefined codeword criterion relates to at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

27. The apparatus of claim 23, the codeword generator is configured to generate codewords based at least in part on at least one of a number of bits of control channel information to be transmitted, a number of codewords to be utilized for at least one other operation, a number of tones to be utilized for a transmission, a type of orthogonal modulation, an available bandwidth, or a combination thereof.

28. The apparatus of claim 23, the codeword generator is configured to scramble the generated set of codewords, wherein the scramble of the generated set of codewords comprises at least one of a scramble of an in-phase and a quadrature-phase of each codeword in the generated set of codewords using disparate scrambling codes for the in-phase and quadrature-phase or a scramble of each codeword in the generated set of codewords utilizing a communication device-specific complex pseudo-random noise sequence of a predetermined length, or a combination thereof.

29. A wireless communications apparatus that facilitates transmission of information, comprising:
means for generating a subset of codewords to facilitate transmission of information; and
means for expurgating a subset of the generated codewords based at least in part on a predefined codeword criterion, wherein expurgating the subset of the codewords comprises worst-case codewords from the set of codewords to create a bandwidth-efficient non-coherent signaling set of codewords that have a predefined cross-correlation property, wherein the set of codewords is complex orthogonal code.

30. The wireless communications apparatus of claim 29, further comprising means for transmitting signals associated with at least a portion of the generated set of codewords.

31. The wireless communications apparatus of claim 30, the at least a portion of the generated set of codewords is a subset of codewords that remain after other codewords are expurgated.

32. The wireless communications apparatus of claim 29, wherein the predefined codeword criterion relates to at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

33. A machine-readable medium having stored thereon machine-executable instructions for:
generating a set of codewords to facilitate transmission of information;
expurgating a subset of codewords based at least in part on a predefined codeword criterion; and
transmitting signals associated with at least a portion of the generated set of codewords using non-coherent signaling, wherein each codeword in the at least a portion of the generated set of codewords is a complex orthogonal codeword.

34. The machine-readable medium of claim 33, the predefined codeword criterion is based at least in part on at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

35. In a wireless communications system, an apparatus comprising:
a processor configured to:
utilize a set of generated codewords, the codewords generated based at least in part on a predefined codeword criterion;
utilize a portion of the set of generated codewords to facilitate transmission of control channel information based at least in part on the predefined codeword criterion;
expurgating a subset of the generated codewords based at least in part on the predefined codeword criterion; and
transmitting signals associated with at least the portion of the set of generated codewords using non-coherent signaling, wherein each codeword in the at least a portion of the set of generated codewords is a complex orthogonal codeword.

36. The apparatus of claim 35, wherein the predefined codeword criterion is based at least in part on at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

37. A method that facilitates transmission of information associated with a communication environment, comprising:
receiving signals associated with a generated set of codewords that facilitate transmitting information comprising control channel information based at least in part on a predefined codeword criterion, at least a portion of the generated codewords associated with the received signals comprise expurgated codewords that are discarded codewords; and
decoding the received signals.

38. The method of claim 37, wherein the predefined codeword criterion is based at least in part on at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

39. The method of claim 37, the decoding the received signals further comprising selecting a codeword associated with the received signals based at least in part on an energy level of the cross correlation between the received signal and a candidate codeword.

40. The method of claim 37, the decoding the received signals further comprising using multi-peak non-coherent decoding to facilitate decoding of the received signals.

41. The method of claim 37, further comprising utilizing a subset of the discarded codewords to facilitate erasure decoding in non-coherent signaling.

42. The method of claim 41, the erasure decoding further comprising:
determining a codeword by maximum likelihood decoding;
selecting at least one codeword from the subset that is perfectly orthogonal to the determined codeword;
calculating an average value of the decoder output energy values corresponding to the at least one codeword;
determining at least one of a difference or a ratio between a decoder output energy value of the determined codeword and the average value of the decoder output energy values corresponding to the at least one codeword;
comparing the at least one of the difference or the ratio to a predetermined threshold level related to a valid decoding result;
determining whether the at least one of the difference or the ratio is greater than or equal to a predetermined threshold level; and
at least one of:
determining that the determined codeword is a valid decoding result, if the at least one of the difference or the ratio is greater than or equal to the predetermined threshold level, or
determining that the determined codeword is not a valid decoding result, if the at least one of the difference or the ratio is less than the predetermined threshold level.

43. The method of claim 41, the erasure decoding further comprising:
utilizing a determined codeword as if it was a known sequence;
estimating propagation channel coefficients based at least in part on the determined codeword;
removing a signal component corresponding to the determined codeword from a received signal;
calculating the average power of the signal that remains after removing the signal component of the received signal;
estimating a background noise level based at least in part on the average power of the remaining signal;
calculating a signal-to-noise ratio based at least in part on the propagation channel estimation and the background noise level estimation;
comparing the signal-to-noise ratio to a predetermined threshold level related to a valid decoding result;
determining whether the signal-to-noise ratio is greater than or equal to the predetermined threshold level; and
at least one of:
determining that the determined codeword is a valid decoding result, if the signal-to-noise ratio is greater than or equal to the predetermined threshold level, or
determining that the determined codeword is not a valid decoding result, if the signal-to-noise ratio is less than the predetermined threshold level.

44. A wireless communications apparatus, comprising:
a memory that retains instructions related to receiving signals associated with a generated set of codewords that facilitate transmitting information comprising control channel information based at least in part on a predefined codeword criterion and decoding the received signals; and
a processor, coupled to the memory, configured to execute the instructions retained in the memory.

45. The wireless communications apparatus of claim 44, wherein the memory further retains instructions related to decoding received signals to determine a codeword based at least in part on an energy level of the cross correlation between the received signal and a candidate codeword.

46. The wireless communications apparatus of claim 44, wherein the memory further retains instructions related to decoding received signals utilizing multi-peak non-coherent decoding.

47. The wireless communications apparatus of claim 44, the predefined codeword criterion relates to at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

48. The wireless communications apparatus of claim 44, wherein the generated set of codewords comprises a first subset of codewords that is utilized to facilitate transmission of control channel information and another subset of codewords comprising discarded codewords, wherein at least a portion of the other subset of codewords is utilized to facilitate transmission of information related to at least one of erasure decoding, interference-level estimation, or a multi-mode control channel operation, or a combination thereof, wherein the multi-mode control channel operation comprises transmission of additional control channel information.

49. A wireless communications apparatus that facilitates transmission of information in a wireless communication environment, comprising:
  means for receiving signals associated with a generated set of codewords that facilitate transmitting information comprising control channel information based at least in part on a predefined codeword criterion;
  means for decoding the received signals; and
  means for performing erasure decoding on a received signal utilizing a subset of the generated codewords that are discarded codewords.

50. The wireless communications apparatus of claim 49, wherein the generated set of codewords comprises a first subset of codewords that is utilized to facilitate transmission of control channel information and another subset of codewords comprising discarded codewords, wherein at least a portion of the other subset of codewords is utilized to facilitate transmission of information related to at least one of erasure decoding, interference-level estimation, or a multi-mode control channel operation, or a combination thereof, wherein the multi-mode control channel operation comprises transmission of additional control channel information.

51. The wireless communications apparatus of claim 49, wherein the predefined codeword criterion is based at least in part on at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

52. The wireless communications apparatus of claim 49, the means for decoding received signals further comprising means for decoding received signals to determine a codeword based at least in part on an energy level of the cross correlation between the received signal and a candidate codeword.

53. The wireless communications apparatus of claim 49, the means for decoding received signals further comprising means for decoding received signals utilizing multi-peak non-coherent decoding.

54. A machine-readable medium having stored thereon machine-executable instructions for:
  receiving signals associated with a generated set of codewords that facilitate transmitting information comprising control channel information based at least in part on a predefined codeword criterion;
  decoding the received signals; and
  performing erasure decoding on a received signal utilizing a subset of the generated codewords that are discarded codewords.

55. The machine-readable medium of claim 54, wherein the predefined codeword criterion is related to at least one of an available bandwidth, a number of codewords in the set of codewords, a number of bits of control channel information to be transmitted at a given time, a cross-correlation value of a respective pair of codewords, a type of orthogonal modulation transmission desired to be used, a defined worst-case cross-correlation value between codewords, a number of tones employed to facilitate transmission of control channel information, or a number of expurgated codewords to be utilized for another operation, or a combination thereof, wherein the other operation, comprising at least one of interference-level estimation, erasure detection, or a multi-mode control channel operation, or a combination thereof.

56. In a wireless communications system, an apparatus comprising:
  a processor configured to:
    receive signals associated with a generated set of codewords that facilitate transmitting information comprising control channel information based at least in part on a predefined codeword criterion;
    decode the received signals; and
    perform erasure decoding of received signals utilizing a subset of the generated set of codewords, the subset comprising discarded codewords.

\* \* \* \* \*